G. J. BARRETT.
TYPE WRITING AND COMPUTING MACHINE.
APPLICATION FILED SEPT. 8, 1911.
1,066,455.
Patented July 1, 1913.
11 SHEETS—SHEET 1.
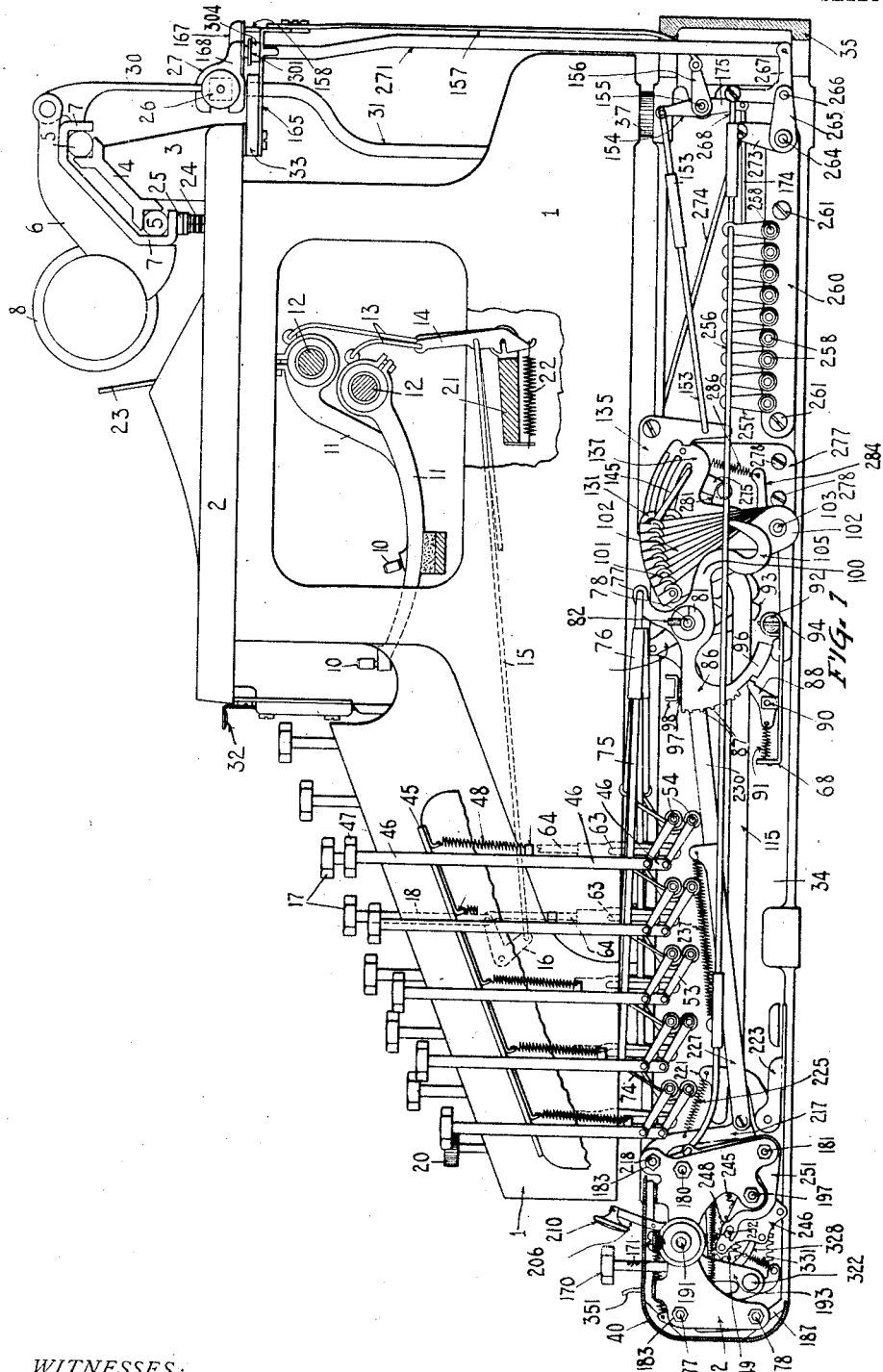
WITNESSES:
L. Nelson
R. H. Strother
INVENTOR.
Glenn J. Barrett
BY Jacob Felbel
ATTORNEY.

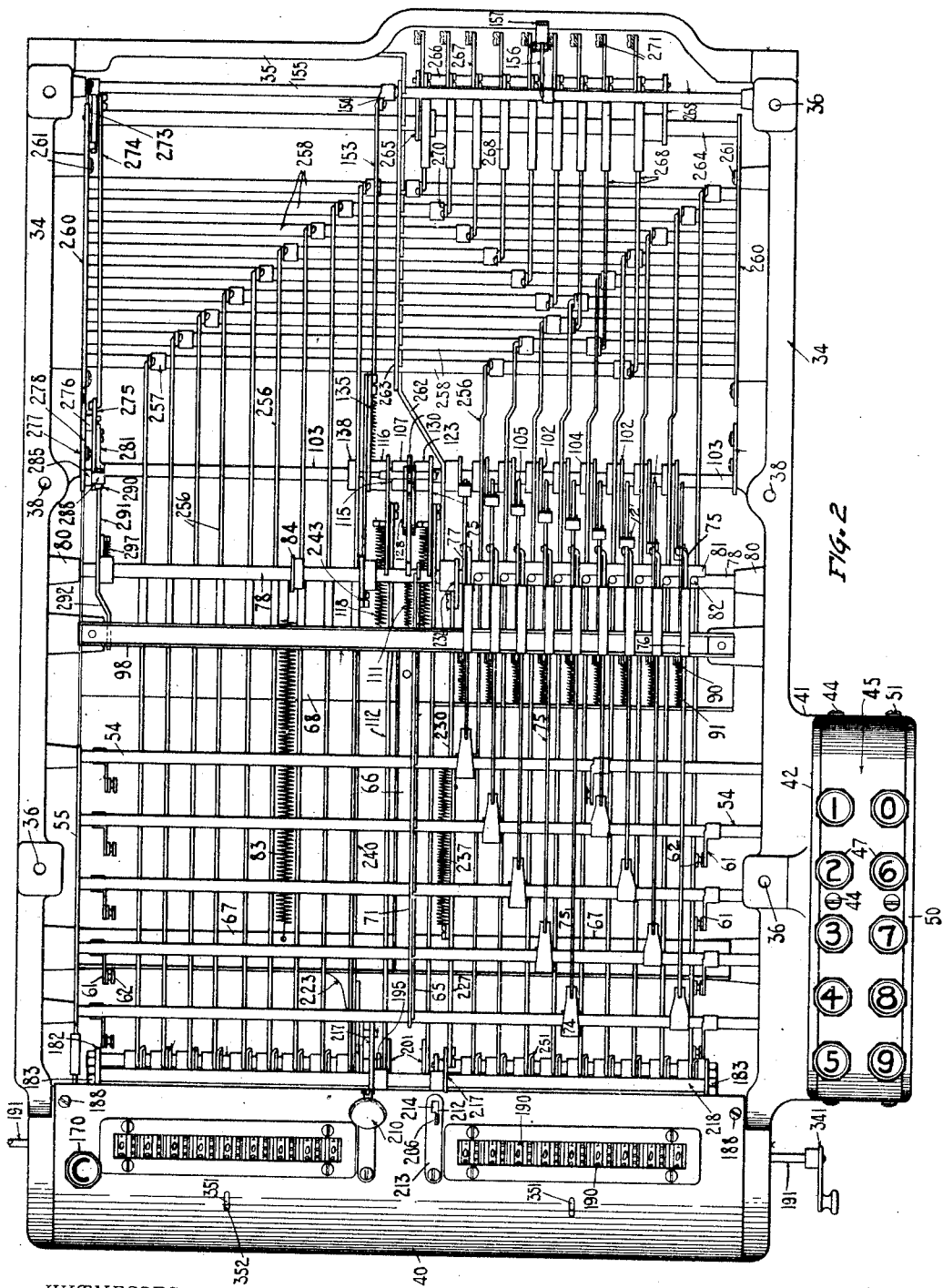

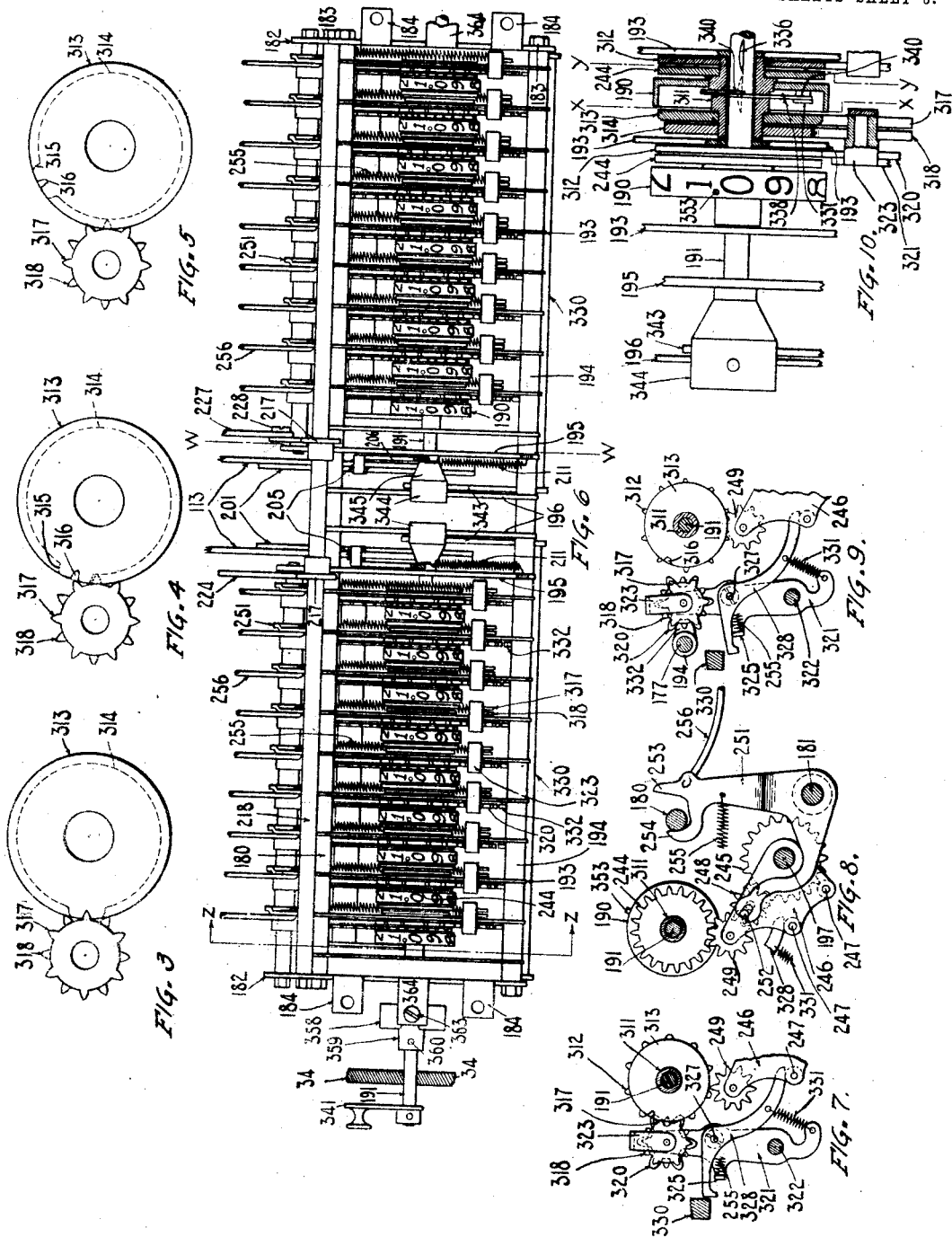
G. J. BARRETT.
TYPE WRITING AND COMPUTING MACHINE.
APPLICATION FILED SEPT. 8, 1911.
1,066,455. Patented July 1, 1913.
11 SHEETS—SHEET 3.

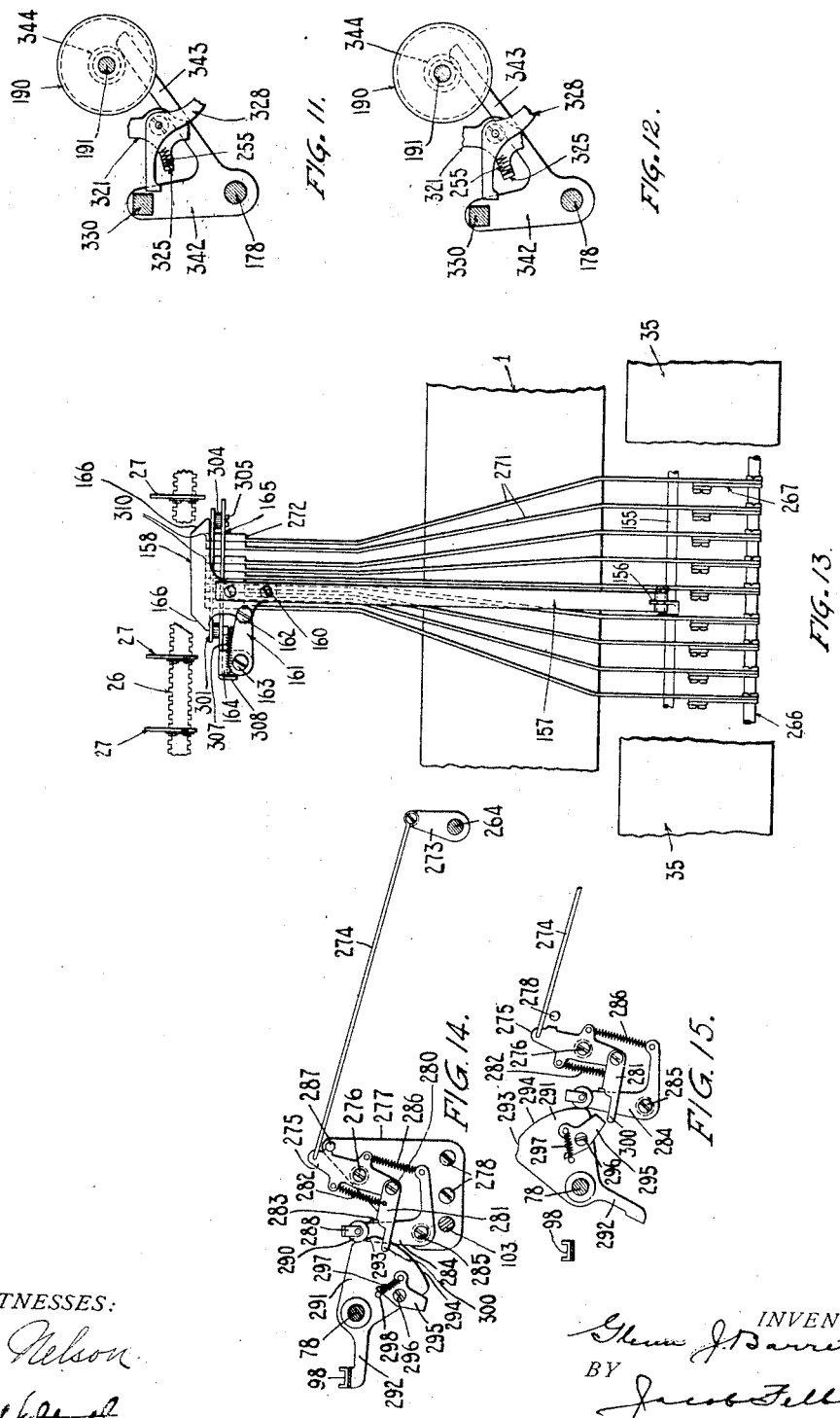

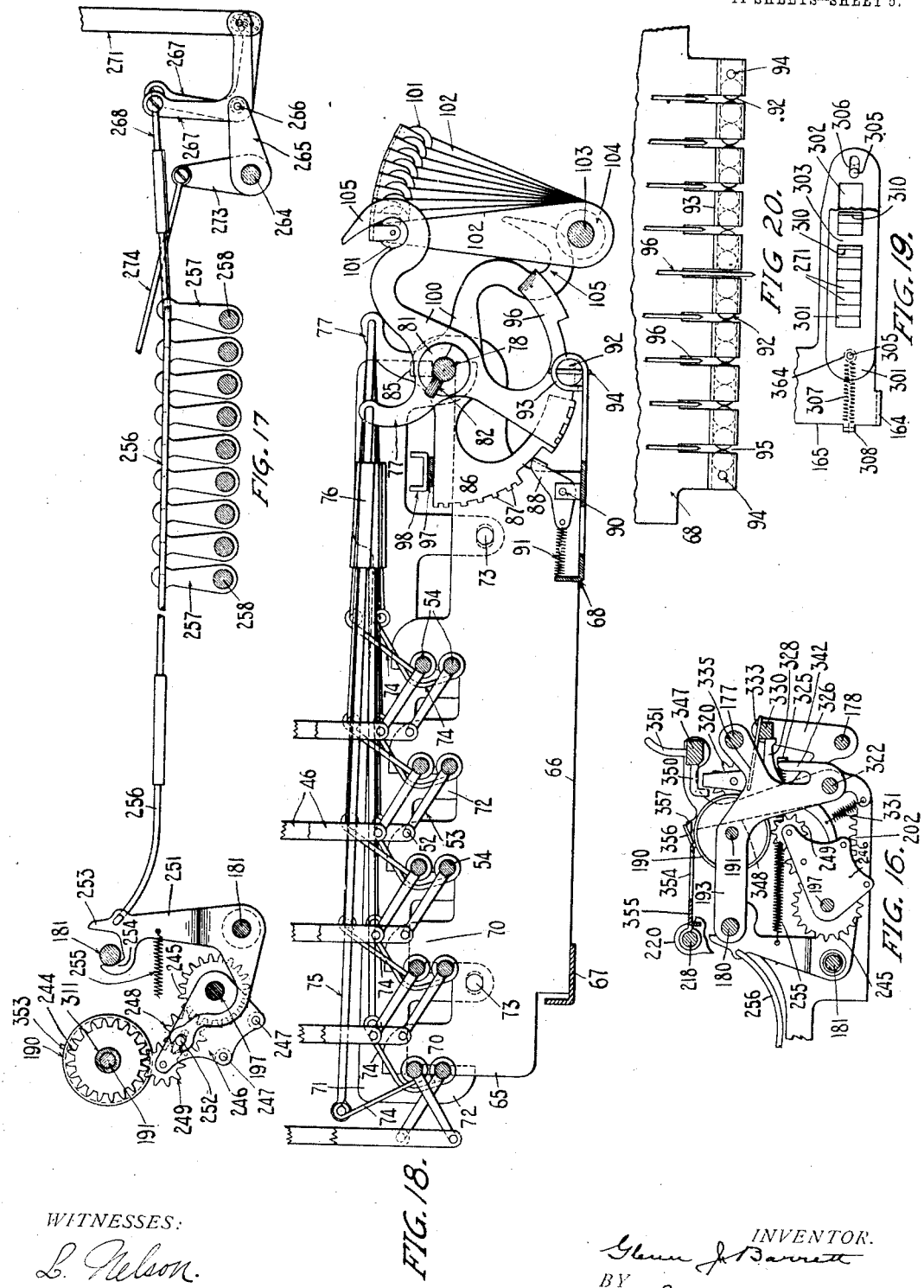
G. J. BARRETT.
TYPE WRITING AND COMPUTING MACHINE.
APPLICATION FILED SEPT. 8, 1911.
1,066,455.
Patented July 1, 1913.
11 SHEETS—SHEET 5.

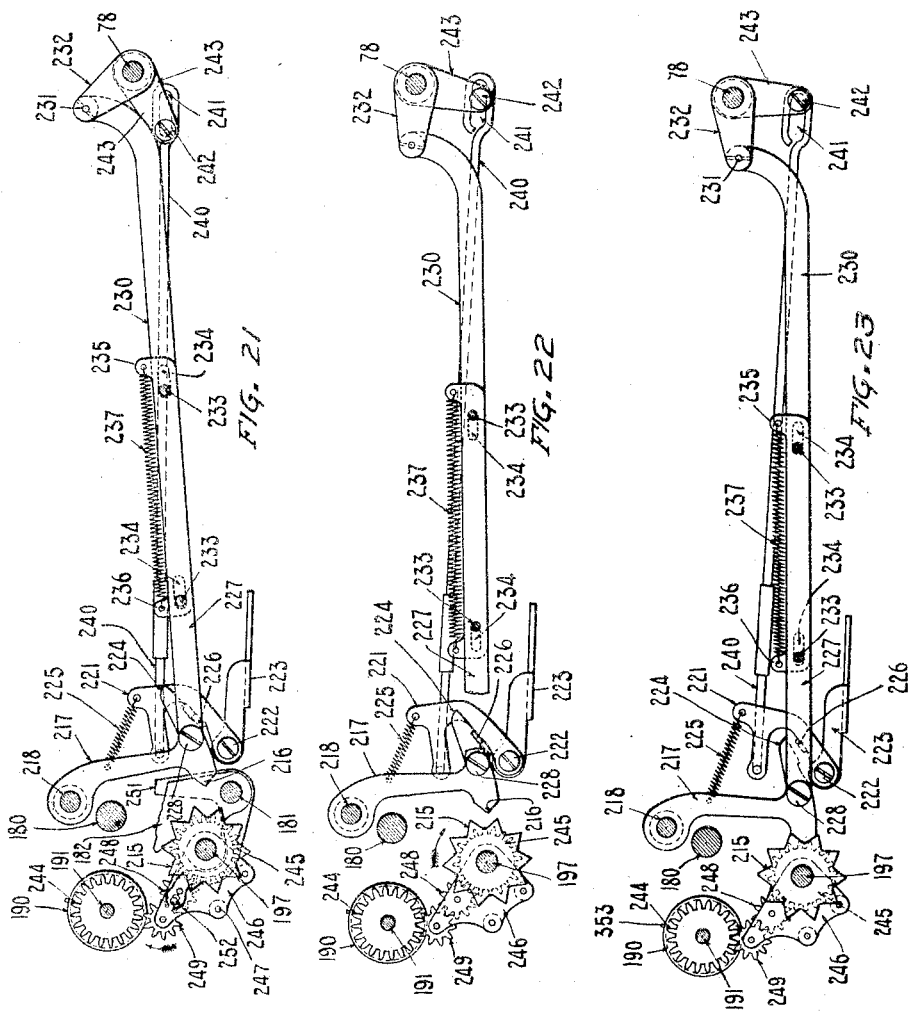

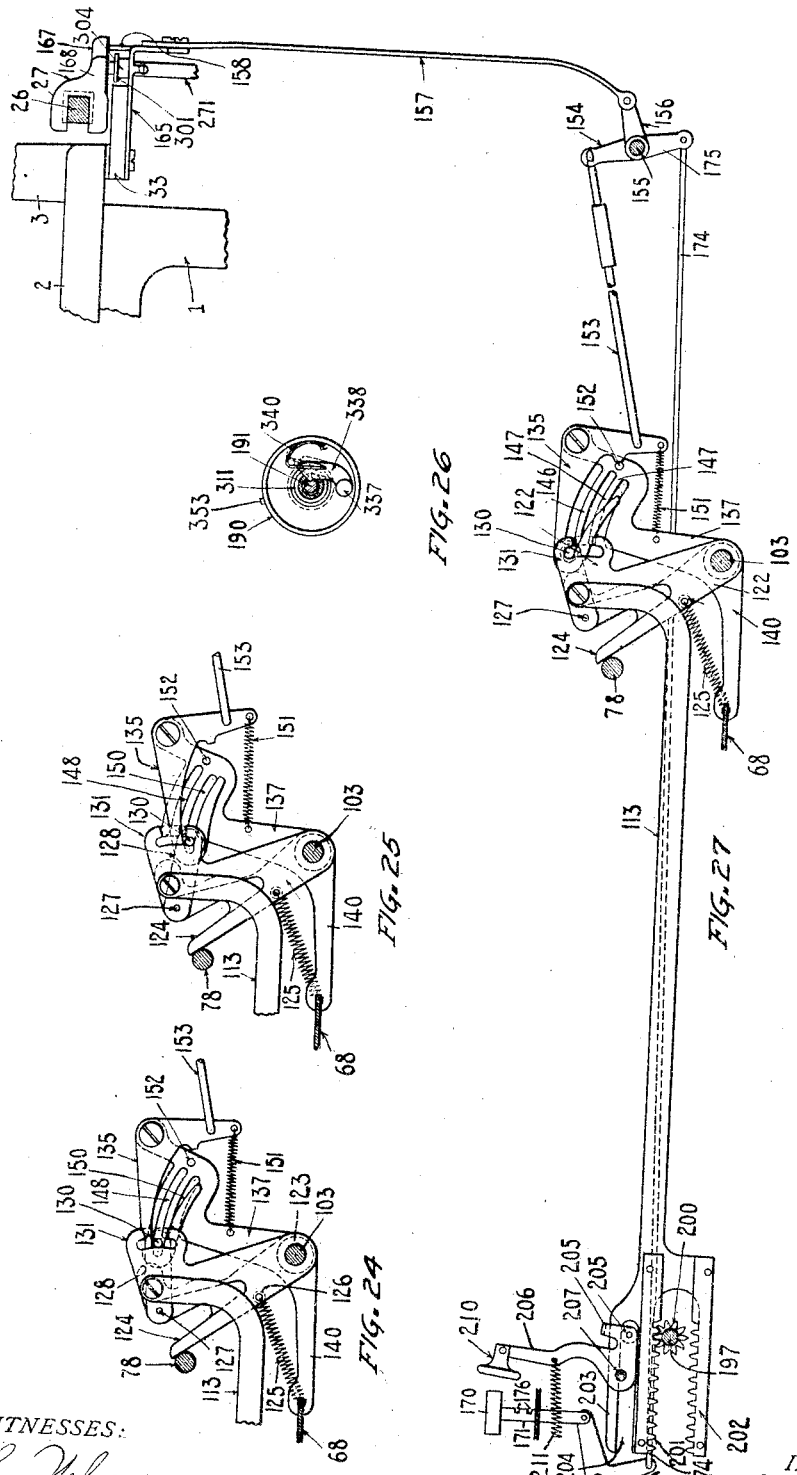

G. J. BARRETT.
TYPE WRITING AND COMPUTING MACHINE.
APPLICATION FILED SEPT. 8, 1911.
1,066,455.
Patented July 1, 1913.
11 SHEETS—SHEET 8.
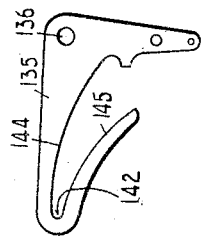
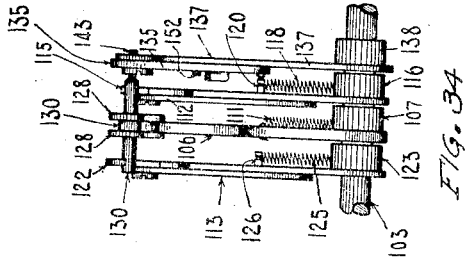
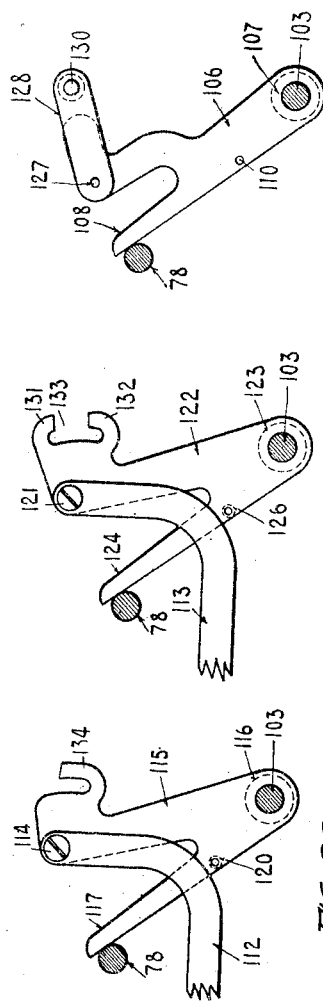
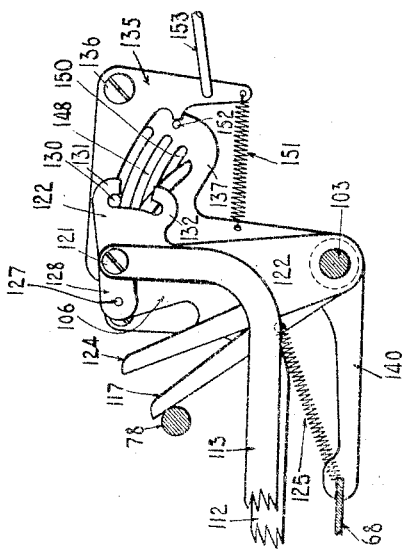
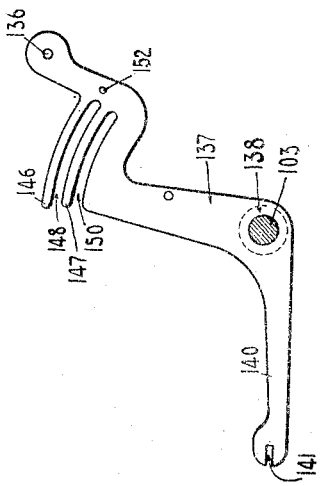
WITNESSES:
L. Nelson.
R. H. Strother.
INVENTOR.
Glenn J. Barrett
BY
Jacob Felbel
ATTORNEY.

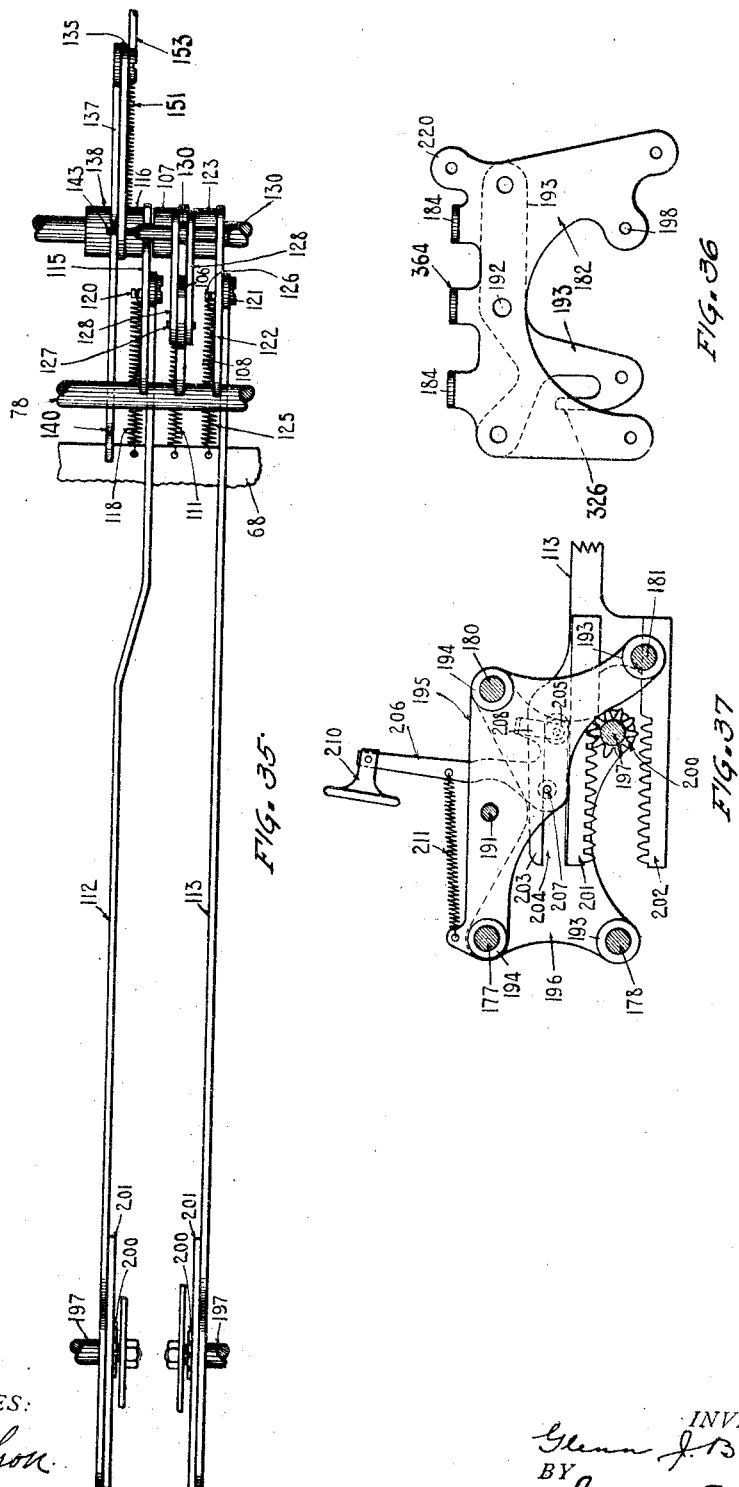

G. J. BARRETT.
TYPE WRITING AND COMPUTING MACHINE.
APPLICATION FILED SEPT. 8, 1911.
1,066,455.
Patented July 1, 1913.
11 SHEETS—SHEET 10.
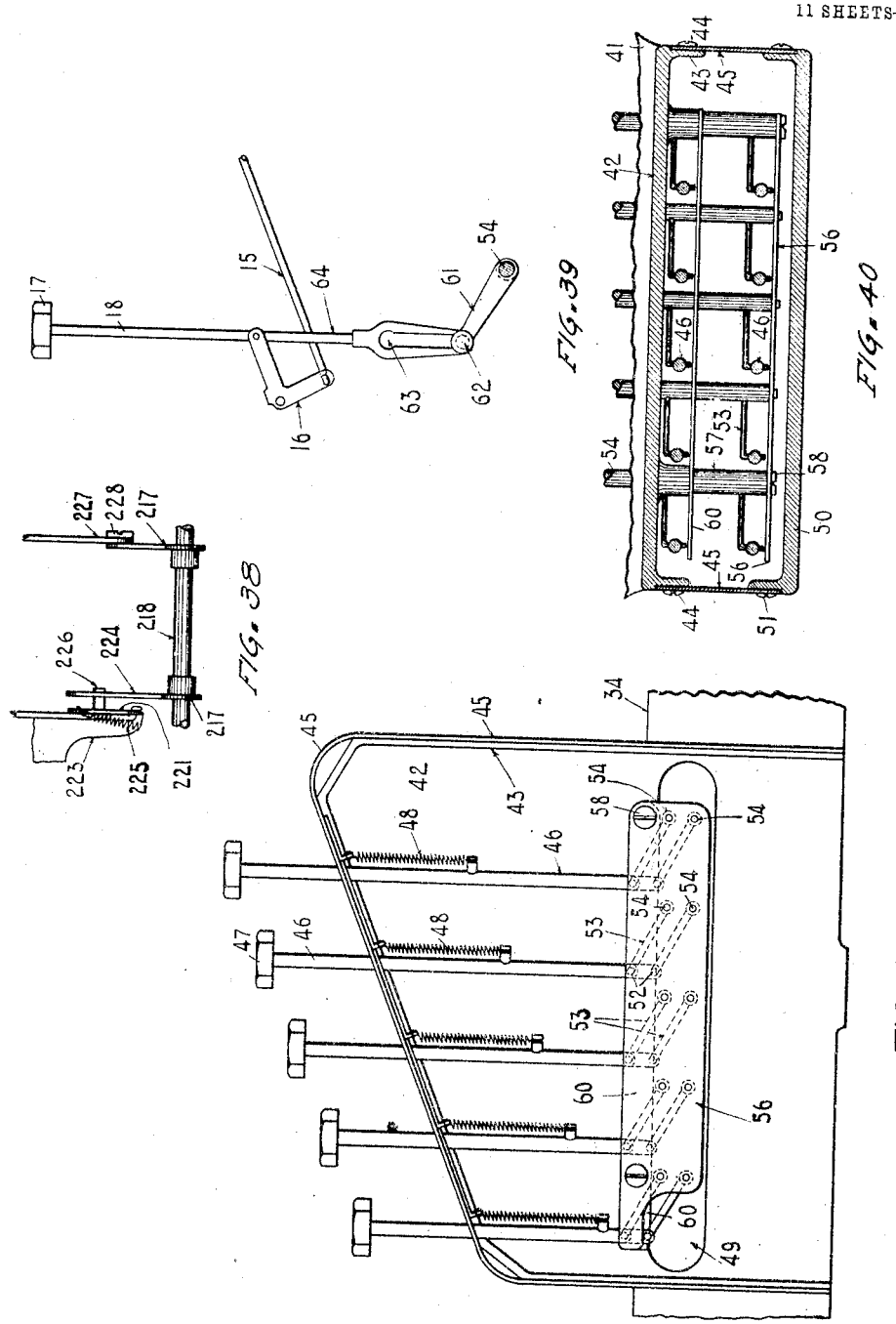
WITNESSES:
L. Nelson
R. H. Strother
INVENTOR.
Glenn J. Barrett
BY
Jacob Felbel
ATTORNEY.

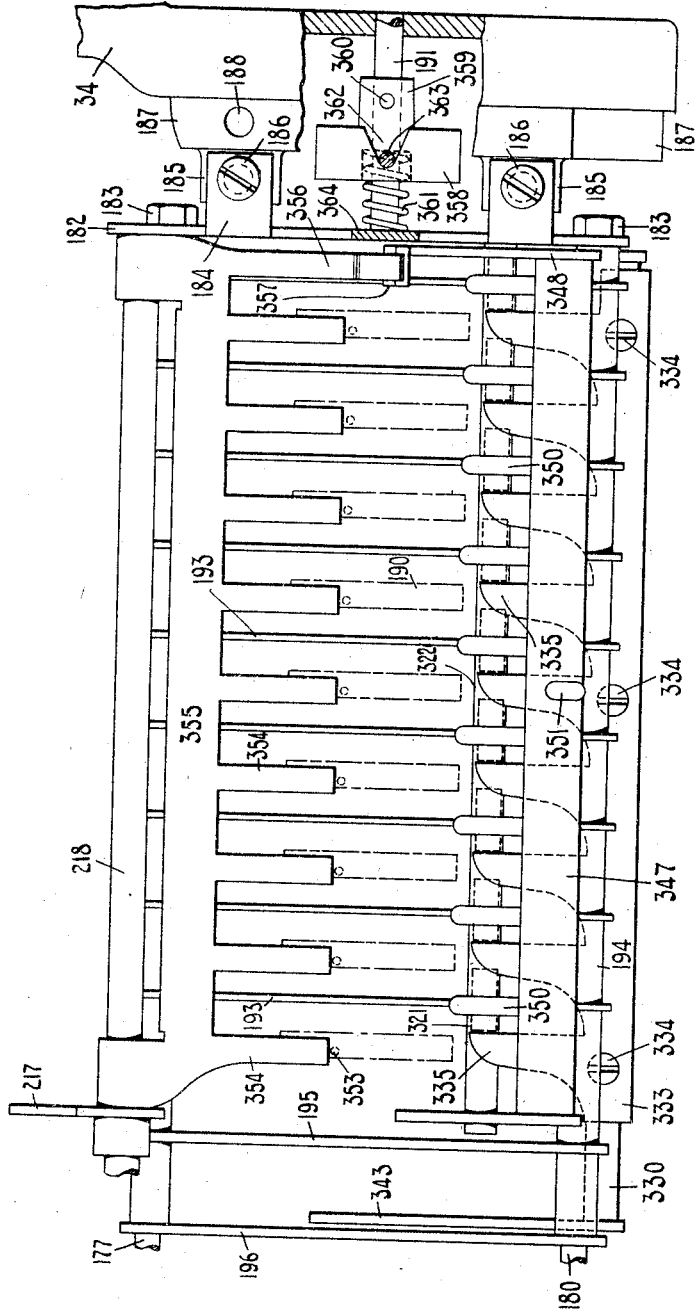

UNITED STATES PATENT OFFICE.

GLENN J. BARRETT, OF GRAND RAPIDS, MICHIGAN, ASSIGNOR TO THE SMITH PREMIER TYPEWRITER COMPANY, OF SYRACUSE, NEW YORK, A CORPORATION OF NEW YORK.

TYPE-WRITING AND COMPUTING MACHINE.

1,066,455. Specification of Letters Patent. Patented July 1, 1913.

Application filed September 8, 1911. Serial No. 648,297.

*To all whom it may concern:*

Be it known that I, GLENN J. BARRETT, citizen of the United States, and resident of Grand Rapids, in the county of Kent and State of Michigan, have invented certain new and useful Improvements in Type-Writing and Computing Machines, of which the following is a specification.

My invention relates to computing machines and also to combined typewriting and computing machines.

The principal object of the invention is to provide an improved combined typewriting and computing machine in which numbers written on the typewriter are automatically registered; but many of the improvements are applicable to computing machines in which there is no printing apparatus, and to so-called listing machines in which the numbers are printed but in which no provision is made for writing words generally.

My invention comprises numerous improvements in the computing mechanism itself, in the connections between the computing mechanism and the typewriting mechanism, in means for actuating a plurality of registers from a single set of keys, in means for effecting either addition or subtraction as desired, in the denomination selecting mechanism, and in other features and parts of the machine, all as will be understood from the detailed description.

To the above ends, my invention consists in certain features of construction and combinations and arrangements of parts, all of which will be fully set forth herein and particularly pointed out in the claims.

One embodiment of my invention is illustrated in the accompanying drawings, in which—

Figure 1 is a right-hand side elevation of the machine with a side plate of the computing machine removed, and with some parts broken away or in section, and some parts omitted. Fig. 2 is a top plan view of the computing mechanism with the typewriter removed, and with a few parts in section. Figs. 3, 4 and 5 are enlarged diagrammatic side views illustrating portions of the transfer mechanism, the parts being shown in different positions in the different views. Fig. 6 is a top plan view of the registers with certain parts omitted and parts broken away. Figs. 7, 8 and 9 are side elevations in vertical section of parts of the registering mechanism and some associated parts. In Figs. 7 and 9 the section is on the line x—x of Fig. 10, and in Fig. 8 the section is on the line y—y of Fig. 10.
Fig. 10 is an enlarged top plan view, partly in section, of part of one of the registers and showing some of the associated mechanism. Figs. 11 and 12 are fragmentary side elevations in vertical section and showing a register wheel and a part of the transfer mechanism and certain locking and releasing devices. Fig. 13 is a fragmentary rear elevation of certain selecting mechanism which is controlled by the typewriter carriage.
Figs. 14 and 15 are side elevations of certain connecting devices, the parts being in normal position in Fig. 14 and in positions corresponding to the bottom of a key stroke in Fig. 15. Fig. 16 is a view of one of the registers in vertical section on the line z—z of Fig. 6. Fig. 17 is a view in vertical fore and aft section of the principal parts of the denomination selecting mechanism in the positions they occupy during the down stroke of a key. Fig. 18 is a view in fore and aft vertical section of some of the key mechanism and the differential mechanism, parts being shown in the positions they occupy when the "9" key is fully depressed.
Fig. 19 is a top plan view of the feelers and associated parts constituting part of the denomination selecting mechanism. Fig. 20 is a top plan view of the key arrester. Figs. 21, 22 and 23 are elevations in fore and aft vertical section and illustrating the mechanism for accurately positioning the parts at the end of a key stroke. Figs. 24 and 25 are fragmentary side elevations of parts of the mechanism for coupling one or the other or both of two registers with the differential mechanism. Fig. 26 is a side view of one of the register wheels. Fig. 27 is a view similar to Figs. 24 and 25 but showing more of the mechanism and also showing means for setting the machine for addition or subtraction. In Figs. 24, 25 and 27 the register selecting mechanism is shown in three different positions. Figs. 28, 29, 30, 31 and 32 are detail views of different parts of the register selecting mechanism. Fig. 33 is a view similar to part of Fig. 27 but on an enlarged scale and showing the parts in the midst of a key stroke. Fig. 34 is a rear elevation of Fig. 33. Fig. 35 is a top plan view of some of the parts shown in Fig. 27.

Fig. 36 is a right-hand end view of part of the register frame. Fig. 37 is a view in fore and aft vertical section on the line w—w of Fig. 6 and showing part of the register frame and one of the add and subtract keys and its connections. Fig. 38 is a fragmentary top plan view of part of the mechanism shown in Fig. 21. Fig. 39 is a detail of one of the numeral keys of the typewriter and its connections. Fig. 40 is a view in horizontal section of part of the computer key connections. Fig. 41 is a side elevation of the computer keys and some of their connections with a casing plate removed. Fig. 42 is a top plan view of one of the registers, on an enlarged scale and showing some of the parts omitted in Fig. 6, and omitting some of the parts shown in said Fig. 6.

In producing a combined typewriting and computing machine I prefer to use a typewriter of standard make and I have here shown my invention in connection with a Smith Premier No. 10 typewriter. The main frame of this machine comprises a lower part 1 consisting of side plates which are suitably connected at their bases and which support a top plate 2. Standards 3 rising from said top plate support a grooved carriage rail 4 which by means of anti-friction balls or rollers 5 supports a paper carriage 6 having grooved rails 7 that coöperate with the rollers 5. The carriage 6 has mounted thereon a platen 8 against the front face of which are adapted to strike types 10 mounted on type bars 11 which type bars are mounted on two segments 12. Said type bars are operated through connections comprising links 13, sub-levers 14, links 15 and key levers 16, by means of printing keys 17, the printing keys 17 having stems 18 which are connected to the bell crank key levers 16. The machine is also provided with a space key 20. The levers 14 are mounted on a segment 21 and are controlled by returning springs 22. Each of the type bars at its free end is adapted to strike against a light lever or universal bar 23 which operates an escapement that allows the carriage 6 to be fed step by step under the impulse of a spring drum which is not shown but which is connected with a gear wheel 24 that meshes with a rack bar 25 on the carriage.

For the purpose of writing columns of figures the carriage 6 is controlled by tabulator mechanism which comprises a column stop bar 26 having mounted thereon column stops 27 (Figs. 1 and 13). The bar 26 is formed with a series of notches as shown in Fig. 13 to provide for adjustment of the column stops to any desired letter space position and said stop bar is supported from the carriage by arms 30, Fig. 1. A series of key operated denominational stops 31 are controlled by tabulator keys 32. When one of these keys is depressed the corresponding one of the stops 31 is pushed up through a guide plate 33 into the path of one of the column stops and mechanism not here shown is operated which releases the carriage 6 from its escapement mechanism and allows said carriage to run free until arrested by the tabulator stops.

I have not deemed it necessary to illustrate or describe the typewriting mechanism in detail as the machine referred to is in extensive use and is well known in the art. The tabulator mechanism is or may be of the sort shown in the patent to Alexander T. Brown, No. 939,587, dated November 9, 1909.

The computer frame comprises a sort of rectangle that is situated beneath the typewriter and on which the typewriter rests. Said frame has two side bars 34 which at their rear are connected by a cross bar 35 and which are also connected by other frame pieces, some, at least, of which will be hereinafter referred to. Holes 36 (Fig. 2) in the top of the bars 34, serve to secure in position short bosses or posts 37, Fig. 1, which take the place of the rubber feet on which typewriters usually stand and said posts serve to connect the computer frame with the typewriter frame. The connection is made more complete by certain screws which pass upward through holes 38 in the computer frame and are threaded into the typewriter frame. The two frames can be disconnected by removing these two screws. As shown in Fig. 1, the computer frame projects somewhat in front of the typewriter frame where it is covered by a casing plate 40 having openings therein through which the register wheels are visible as seen in Fig. 2.

The computing machine here shown is key operated, although many of the features of the invention are applicable to machines that are otherwise operated; and in the present instance a special set of numeral keys is provided which operates the computer and the typewriter, the ordinary typewriter numeral keys being left free to print numbers that are not intended to be registered. As shown in Fig. 2, the right-hand side bar 34 has an off-set 41 extending to the right of the typewriter frame and thence extending vertically to form a sort of plate 42 having a flange 43 (Figs. 40 and 41) projecting therefrom. To said flange there is secured by screws 44 a strip of sheet metal 45 bent into the shape shown in Fig. 41 to constitute a sort of casing and guide for the stems 46 of the special computer keys 47 and said key stems inside the casing 45 are provided with restoring springs 48. The key stems 46 are made of such length as to bring the keys 47 up to somewhere near the level of the printing keys 17 of the typewriter.

Just below the off-set 41, the side bar 34 has an opening 49, Fig. 41, for the key connections. The casing for the special key system is completed by an outside plate 50, Fig. 40, which is secured by screws 51 to the strip 45. The keys are here shown as arranged in two fore and aft rows and each of the key stems 46 is pivoted at its lower end at 52 to a crank arm 53 projecting from a rock shaft 54 which extends horizontally through the opening 49 and across the machine. There are ten of these rock shafts arranged in two tiers as shown in Fig. 41 and each of them is pivoted at its left-hand end in a plate 55, Fig. 2, secured to lugs of the left-hand frame plate 34. At their right-hand ends the shafts 54 are pivoted in a frame plate 56 secured by posts 57 and screws 58 to the parts 41 and 42.

As shown in Fig. 40 the key stems are simply set on bent-off crank pins on the arms 53 and said key stems are prevented from becoming displaced from said crank arms by the plate 56 and also by a second plate 60 arranged adjacent the left-hand series of key stems. In the Smith Premier No. 10 typewriter the numeral keys are arranged in two rows at the left-hand and right-hand sides of the keyboard and the capital "O" is used for writing the zero. At the appropriate place to coöperate with these several typewriter keys, each of the rock shafts 54 has an arm 61 projecting therefrom and carrying a headed crank pin 62, which crank pin as shown in Fig. 39 normally rests in the lower end of a key-hole slot 63 formed in the lower end of a link 64 which is connected to the bell-crank key lever 16 of one of the keys 17. The construction is such that when a shaft 54 is rocked by one of the computer keys 47, it operates the corresponding numeral key 17 of the typewriter to print the numeral; but when said key 17 is operated the slot 63 slides idly on the pin 62 so that the numeral is printed without affecting the computer. As is indicated in Fig. 1, the arms 53 are preferably a little longer than the arms 61 so that the keys 47 have a greater extent of dip than the keys 17, thus allowing a sufficient amount of additional power to operate the computer in addition to the operation of the typewriting mechanism.

In order to stiffen the rock shafts 54 I have preferred to provide bearings for said shafts near the middles thereof. In the present instance, said bearings are provided in a plate 65 best shown in Figs. 2 and 18. In Fig. 2 this plate is shown as bent-off at the bottom to form an angle or channel bar 66 which is secured at its ends to two cross bars 67 and 68 in the base of the machine, said cross bars being supported by the side plates 34. As shown in Fig. 18, the plate 65 is formed with a series of upward projections 70 which in their front edges are cut out in semi-circular form to receive the shafts 54. A second plate 71 is mounted by the side of the plate 65 and said second plate has a series of downward projections 72 formed on their rear edge with semi-circular cut-outs to receive said shafts. In assembling the machine the plate 65 is set in position and then the plate 71 is set by the side of it and properly adjusted and secured to said plate 65 by means of screws 73.

The connections from the shafts 54 to the remainder of the computing mechanism, comprise upstanding arms 74 secured to the several shafts 54, those from the lower tier of shafts being suitably bent as shown in Fig. 18 to clear the shafts of the upper tier. The shaft 54 connected with the zero key, however, is not provided with one of these arms 74 and has no connection with the computing mechanism. Each of the arms 74 has pivoted thereto the forward end of a horizontal link 75 and each of said links preferably has a turn-buckle 76 therein for adjusting its length, as shown in Figs. 1, 2 and 18. Each of the links 75 at its rear end is pivoted to a lever arm 77 which, in turn, is pivoted on a rock shaft 78 which at its ends is journaled in bosses 80 of the side plates 34. The shaft 78 is a rock shaft which constitutes a sort of universal bar for the computing mechanism, as it is rocked in unison with any one of the lever arms 77 when said lever arms are operated by the keys. To this end each of said arms 77 has a hub 81 which is formed with a cut-out and into said cut-out a pin 82 projects from the shaft 78. This construction is clearly shown in Fig. 2 from which it will be seen that the shaft is rocked through the parts described at each operation of one of the arms 77. The shaft 78 is provided with a returning spring 83, Fig. 2, connected at one end to an arm 84 depending from said rock shaft and at the other end to the cross bar 67. As shown in Fig. 18, the plates 65 and 71 are preferably extended to the rear and suitably connected as shown at 85 to stiffen said shaft.

Each of the lever arms 77 is made integral with a segment 86 which constitutes part of a full stroke and key arrester mechanism. Each of said segments is formed on its forward edge with a series of square teeth 87 which coöperate with a pawl 88 pivoted at 90 to the cross bar 68. As here shown there is one of these pawls for each of the segments 86 and each of said pawls is controlled by a restoring spring 91 which normally stands at a dead center position as shown in Fig. 18. The pawl is free to turn in either direction from said dead center position. When one of the segments has started down, it is caught by its pawl 88 and cannot return to normal position until it has completed its down stroke and the pawl has snapped off of the end of the segment. On the upstroke of the key the pawl is turned the other way and prevents downward motion of said key and segment until the upstroke is completed.

The key arrester, as shown in Figs. 18 and 20, comprises a series of balls 92 inclosed in a tube 93 formed by bending up the rear edge of the plate 68. Said balls are contained between two pins 94 which limit their extent of spreading motion. The rear part of the plate 68 is formed with a series of slots 95 through which the rearward extensions 96 of the segments 86 are adapted to pass. The construction is such that when one of these extensions or arms 96 is between the balls 92 there is not room for any other of said extensions to pass between said balls so that another key cannot be depressed until the first one has been restored to normal position by its spring 48. The parts are arrested in normal position by a strip 97 of leather or other suitable material secured to the under side of a cross bar 98 which acts as a stop bar for the key-operated parts. A key arrester and full-stroke mechanism similar to those above described, are shown and described and claimed in a prior application of mine.

The differential mechanism comprises arms 100 each integral with one of the lever arms 77 and segments 86. These arms 100 extend from the shaft 78 toward the rear and somewhat downward and each of them constitutes a cam that coöperates with a follower roller 101. There are nine of these rollers and each of them is journaled in an arm 102, said arms being fixed on a transverse rock shaft 103, by means of hubs 104 which are rigidly secured to said shaft. The arms 102 are spirally arranged as shown so that the different cam arms 100 operate them to different extents. Each of said cam arms terminates in a hook 105 leaving a slot which prevents overthrow of the roller 101. The last part of the cam edge of the slot is concentric with the shaft 78 and therefore constitutes a short dwell.
As shown in Fig. 1 where the parts are represented in normal position, there is also a little lost motion between the arms 100 and the rollers 101 which gives time for certain preliminary operations as will appear hereinafter.

The differential motion of the shaft 103 is communicated to an arm 106, Figs. 30 and 34, which arm is provided with a hub 107 that is rigidly secured to the shaft 103.
Said arm 106 is formed with a branch 108 which normally rests against the shaft 78 and thus determines the normal position of said arm and of the shaft 103. This branch 108 is of such construction that it can be adjusted by bending it. At 110, Fig. 30, the arm 106 has connected thereto a restoring spring 111 shown in Figs. 34 and 35. The machine shown in the drawings is provided with two registers as indicated in Figs. 2 and 6, and said two registers are operated by two separate rack bars and means are provided for coupling the arm 106 with either one of these rack bars separately or with both of them at the same time. Said rack bars are shown in Figs. 33 and 35, the left-hand bar being numbered 112 and the right-hand bar 113. As best shown in Fig. 28 the left-hand bar 112 is pivoted at 114 to an arm 115, the hub 116 of which is pivoted on the shaft 103 at the left of the hub 107, as shown in Fig. 34, which figure is a rear view. The arm 115 is formed with a branch 117 which normally rests against the shaft 78 and said arm is restored to and held in normal position by a spring 118 connected at one end to a pin 120 projecting from said arm and at the other end to the plate or bar 68 as shown in Fig. 35. As shown in Fig. 29 the rack bar 113 is pivoted at 121 to an arm 122, the hub 123 of which is pivoted on the shaft 103 at the right of the hub 107. Said arm 122 is formed with an arresting branch 124 and is provided with a restoring spring 125 attached to a pin 126 and to the plate 68, the whole construction so far described being similar to the corresponding connections of the rack 112.

The arm 106 has pivoted thereto at 127 a double link or two parallel links 128 which extend from said pivot toward the rear and to the free ends of which is secured a cross pin 130, which extends across the arms 115 and 122 as shown in Figs. 34 and 35. The construction is such that the pin 130 can be moved up and down by turning the links 128 about the pivot 127. The arm 122 is formed at its upper part and at its rear edge with an upper hook 131 and a lower hook 132, leaving an open space 133 between said hooks. The construction is such that when the pin 130 is in its uppermost position as shown in Fig. 33 and also when said pin is in its lowermost position, said pin is coupled to the arm 122 by the hook 131 or 132 as the case may be, and the arm 122 is thereby coupled to the arm 106 so that when the shaft 103 is rocked the rack bar 113 will be correspondingly moved endwise. When the pin is in its middle position shown in Fig. 24, the arm 122 and bar 113 are not coupled to the arm 106 and are not operated when a key is depressed.

The arm 115 is formed with a hook 134 (Fig. 28), which hook corresponds in position with the hook 132 and also extends upward to correspond with the open space 133, so that when the pin 130 is either in its lowermost position or in its middle position the arm 115 will be coupled to the shaft 103 and the rack 112 will be operated by the rocking of said shaft. It will be perceived that when the pin 130 is in its uppermost position shown in Fig. 27, the right-hand register only will be operated, when said pin is in its middle position as in Fig. 24, the left-hand register only will be operated, and when said pin is in its lowermost position shown in Fig. 25, both registers will be operated by an operation of the computer keys.

The pin 130 is moved to any one of its three positions by means of a lever 135 which is pivoted at 136 to a stationary plate 137 which is here shown as provided with a hub 138 mounted loosely on the shaft 103. Said plate 137 also comprises a horizontal arm 140 which, as shown in Fig. 32, is formed at its forward end with an open slot 141 which, as shown in Fig. 33, embraces the plate 68 and prevents the plate 137 from turning about or with the shaft 103. The lever 135 has a forwardly directed arm in which is formed a slot 142, Fig. 31, into which projects the reduced end 143, Fig. 35, of the pin 130. Said pin of course moves toward the back of the machine and returns toward the front of the machine each time the shaft 103 is oscillated and said pin therefore normally stands in its forward position. The forward end of the slot 142 is of a width substantially equal to the thickness of the parts 143 of the pin, so that, when said pin is in its normal forward position it will be moved up or down by the rocking of the lever 135. The upper edge 144, Fig. 31, of the slot 142 is struck on an arc which, when the pin 130 is in its upper position shown in Fig. 33, is concentric with the shaft 103; and the lower edge 145 of said slot is preferably struck on an arc which is concentric with said shaft when said lever is in its lowermost position shown in Fig. 25. As shown in Fig. 32, the plate 137 is formed with two fingers 146 and 147, said fingers being curved concentrically with the shaft 103 and the construction is such as to leave two slots 148 and 150 in said plate 137. The fingers 146 and 147 have their forward ends just in rear of the normal forward position of the pin 130 as shown in Figs. 24, 25 and 27 so that when said pin and the shaft 103 are in normal position the pin is free to be adjusted to any one of its three positions; but when the shaft 103 begins to rock toward the rear the pin either moves over the finger 146 or else into one of the slots 148, 150 so that the up and down position of said pin cannot be changed after the shaft has begun to turn. The forward ends of the fingers 146 and 147 also serve as a lock to prevent the depression of a key unless the pin 130 is positioned in one of its three positions with sufficient accuracy to be guided by said fingers exactly into its right position.

The lever 135 is of bell crank form and it is normally held in its uppermost position by means of a spring 151 connected to said bell crank and to the plate 137. Said bell crank is arrested in its normal position by a stop pin 152 projecting from the plate 137. It will be perceived that the machine is normally set to operate only the right-hand register but that it can be set to operate only the left-hand register by moving the lever 135 part way down and it can be set to operate both registers by moving said lever all the way down.

I have provided both automatic means and hand operated means for controlling the lever 135. The automatic means is shown in Figs. 1, 2, 13 and 27. The depending arm of the bell-crank 135, has connected thereto a link 153 which, at its rear end, is connected to a crank arm 154 projecting upward from a transverse rock shaft 155 in the rear of the machine. Said rock shaft has projecting therefrom toward the rear, a second crank arm 156 to which is pivoted the lower end of a bar or link 157 which at its upper end carries a cam or contact bar 158 which is here shown as secured to the upper end of the bar by screws 160. It will of course be understood that the bar and the plate can be integral, as they constitute in effect a single piece. The upper end of this piece is guided by a link 161 pivoted thereto at 162 and also pivoted at 163 to an ear 164 bent downward from a guide plate 165 which, in the present instance, is secured to the under side of the guide plate 33 of the denominational tabulator stops. Any suitable provision can be made for the adjustment of the bar 157 as to length. As here shown said bar has a bend near its lower end and the effective length of the bar can be changed by modifying this bend. As will be understood by referring to Fig. 13, the upper surface of the plate 158 is straight and is of a length corresponding to the length of travel of the typewriter carriage as said carriage passes through the adding column. At each end, at 166, the edge of said plate is beveled to act as a cam, which cam is controlled by an extension 167 of one or more of the column stops 27. The construction is such that when in the travel of the carriage this extension passes over the plate 158, said plate will be depressed and will be held down during the travel of the carriage through the adding field. The extent to which the plate will be depressed, will depend upon the elevation of the lower edge of the extension 167 and this extension may, therefore, be so constructed as to depress the plate far enough to bring the pin 130 either into the slot 148 or into the slot 150 as desired; and if desired two or more column stops can be provided each having such extensions and any one of said stops desired can be caused to connect the differential mechanism either with the left-hand register or with both registers. I have shown in Fig. 1 a column stop having a shorter extension 168, which shorter extension coöperates with the denomination selecting devices as will hereinafter appear, but is not long enough to reach to the plate 158. When this second stop is passing the plate 158 the right-hand register only will be connected with the differential mechanism. It will thus be seen that by suitably selecting and adjusting the column stops, adding fields can be located anywhere desired on the paper and the numbers written in any one of said adding fields can be caused to be registered on either one of the registers or on both as desired and this will be done automatically without any further attention on the part of the operator, once the machine has been set.

The hand operated means for controlling the bell-crank 135 and thus selecting the register to be operated, comprises a key 170 mounted on a key stem 171, Fig. 27, and pivoted at its lower end to the horizontal arm of a bell-crank 172 which bell-crank is pivoted at 173 to a fixed part of the machine. Said bell crank has a depending arm to which is pivoted the forward end of a link 174, the rear end of which is pivoted to a crank arm 175 depending from the rock shaft 155. The construction is such that the bell-crank 135 can be depressed by depressing the key 170. The stem 171 of said key passes through a hole in the cover plate 40 and said stem has one or more notches 176 cut therein at suitable points so that when the key is depressed it can be held in its depressed position by hooking a notch 176 over the plate 40. If preferred, the key stem can be provided with only one of these notches 176 so arranged as to hold the key at its full extent of depression in order to connect both registers with the differential mechanism. The key 170 can, if desired, be used alone for selecting the registers to be operated and the column stops employed can all be devoid of the extensions 167; or if desired one or more column stops can be used with extensions 167 each adapted to bring the lever 135 to its middle position to bring the left-hand register alone into operation and the key 170 can be used whenever it is desired to add on both registers. It will be seen that by suitably selecting the column stops and by suitable manipulation of the key 170 the machine can be used for a great variety of work.

The different settings of the lever 135, are illustrated in Figs. 24, 25 and 27; and in Fig. 33 the parts are shown in one setting in the position they occupy when a key is partly depressed. In this figure the pin 130 is in its uppermost position and the rack bar 113 is being operated, the rack bar 112 remaining in normal position. Fig. 34 also shows the pin 130 in its uppermost position.

It will of course be understood that the number of registers can be increased and the register selecting system can be extended or duplicated if desired.

In the present instance I have shown two registers, a right-hand register and a left-hand register. The register frame or frames as here shown are stationary and both registers may be said to have a single frame which is detachably mounted in the machine. In Fig. 37 there are shown four transverse rods 177, 178, 180 and 181. Of these, the two upper rods 177 and 180 are frame rods which extend the entire length of the two registers and are supported at their ends by vertical frame plates 182 (Figs. 36 and 6) to which the rods are secured by nuts 183 threaded on to the reduced ends of the rods, which reduced ends pass through holes (Fig. 36) in the end plates. Each of the end plates 182 has bent off therefrom two horizontal ears 184, which ears overlie ears 185 (Fig. 42) projecting from the side bars 34 at the front of the machine, the ears 184 and 185 being secured together by screws 186. The bars 34 also have flat flanges 187 to which the cover plate 40 is secured by screws at 188. There are two of the rods 181, each a fixed frame rod of about the length of one of the registers and secured at its outer end to the plate 182 and at its inner end to another frame plate. The rod 178 is a rock shaft which will be again referred to.

The register wheels 190 are strung along a shaft 191 (Fig. 37) which shaft passes through holes 192 (Fig. 36), said holes being made through the end plates 182 and also through certain other plates. The register wheels 190 are separated by a series of partition plates 193 having the form shown in Fig. 36, said partition plates being strung along rods 177 and 180 and separated by washers 194. In numbering the frame rods in some of the figures no distinction has been made between the rods themselves and the washers strung along them. At the inner end of each register there are two plates 195 and 196 shown in plan view in Figs. 6 and 42 and in outline in Fig. 37, and it is to the plate 195 that the inner end of the frame rod 181 is secured. The shaft 191 passes through said plate 195 but the plate 196 is formed as shown in Fig. 37 with a depression in its upper edge so as to clear said shaft for a reason which will appear hereinafter. There is for each register an operating shaft 197, which, as shown in Fig. 37, is journaled at its inner end in the plate 196 and which at its outer end is journaled in a hole 198 (Fig. 36), in the plate 182 so that this shaft extends the length of the register. In the machine shown there are two of these shafts arranged co-axially and each of them has mounted near its inner end a pinion 200 and said pinions are driven by the rack bars 112 and 113. As shown in Fig. 37, each of these rack bars at its forward end is forked, having a toothed rack 201 above the pinion 200 and another toothed rack 202 beneath said pinion and so arranged that said pinion can be engaged by either rack by moving the rack bar up or down.

It will be perceived that by setting the rack bar in its upper or lower position the shaft 197 can be turned one way for addition and the other way for subtraction. It will also be perceived that either of the rack bars can be set for one of these characters of arithmetical operation and the other rack bar set for the other character of operation or both rack bars can be set for the same operation as desired so that it is possible to add a number on both registers at once or to subtract it from both registers at once or to add it on either register and subtract it from the other as desired; and it is also possible, by the register selecting system which has been described, either to add or to subtract a number on either register without operating the other register at all. In order to shift the rack bars up and down each of them is formed with a third branch 203, leaving a slot 204 in which travels a roller 205 which is pivoted in the rear arm of a bell-crank 206, which bell-crank is pivoted at 207 to the plate 195. The horizontal arm of the bell-crank arm is formed with an armor branch 208 that extends upward and is bent over in inverted U-shape and the roller is journaled between the two branches of this arm and the branch 203 of the rack bar also passes between the two branches of said arm and is thereby guided. The bell-crank 206 carries a key 210 at its upper end and said bell-crank is normally drawn toward the front of the machine by a spring 211 which tends to move the lower rack 202 into engagement with the pinion 200. Each of the bell-cranks 206 extends upward through a suitable slot 212 in an escutcheon 213 secured to the casing plate 40. Said slot 212 is formed at its rear end with an off-set 214 so that when the key 210 is pushed back against the tension of the spring 211, it can be set a little to one side and retained in that position. The registers here shown work equally well either way, but the numbers are shown arranged on the wheels in such order that the registers add when the keys 210 are in their rear positions with the upper racks 210 in engagement with the pinions 200 and said registers subtract when the keys are in their forward positions.

In order to position the shaft 197 accurately at the end of each down stroke of a key, I employ the mechanism best shown in Figs. 21, 22, 23 and 38. Near its inner end each of the shafts 197 has mounted thereon a ten-toothed star wheel 215 and said star wheels are adapted to be arrested and positioned by the pointed ends 216 of pawls or detents 217. There is one of these pawls for each of the two star wheels. Both pawls are rigidly mounted on a transverse rock shaft 218 which at its ends is journaled in ears 220 (Fig. 36) of the end plates 182, so that both of said pawls move into and out of engagement with the star wheels together. Said pawls normally stand away from the star wheels as shown in Fig. 21. There is provided a spring-pressed latch lever 221, pivoted at 222 to a bracket 223, which bracket is secured, in the present instance, to the cross bar 67, as shown in Fig. 2. The latch 221, as here shown, cooperates only with the left-hand one of the two detents 217 which detent has an arm 224 projecting rearward therefrom for the purpose. In Fig. 22 some of the parts connected with the right-hand detent 217 are broken away in order to show this arm and the latch lever more clearly. Said latch lever is drawn toward the front of the machine by a spring 225 connected thereto and to the detent 217. As shown in Figs. 22 and 38, the latch lever 221 has an ear 226 projecting to the right therefrom into position to engage a notch or hook formed on the lower edge of the arm 224. The construction is such that these coöperating parts are adapted to hold the toothed detents 217 in inoperative positions. The means for operating said detents are here shown as connected with the right-hand one thereof and said means comprises a bar 227 pivoted to the right-hand detent at 228 and extending therefrom toward the rear of the machine. A second bar 230 is pivoted at its rear end at 231 to an arm 232 projecting from the shaft 78, which, it will be recalled serves as a sort of universal bar for the key-operated parts of the machine and which at each key depression is rocked toward the front of the machine. The arm 232 normally stands as shown in Fig. 21, at an inclination upward and toward the front of the machine and at the bottom of the key depression it stands as shown in Fig. 23, about on or a little past the dead center of the bars 227, 230. These bars have an endwise sliding connection consisting of headed screws 233 which pass through elongated slots 234 in the bar 230 and are threaded into the bar 227. At their ends said bars are formed with upstanding ears 235 and 236, which ears are connected by a spring 237. During the depression of a key the rocking of the arm 232 forces the bars 230 and 227 and the detent 217 toward the front of the machine until said detent is arrested by the latch 221 as shown in Fig. 22 after which the bar 230 continues to move forward against the tension of the spring 237, the bar 227 being held by the latch 221. At the very last of the down stroke of the key, said latch is released by the means now to be described.

A link 240 is pivoted at its forward end to the latch lever 221 and at its rear end said link is formed with an elongated slot 241 through which loosely passes a screw 242 secured to the free end of an arm 243 rigidly mounted on the rock shaft 78 and normally extending thence forward and downward. The pin or screw 242 is normally in the forward end of the slot 241 and at the end of the down stroke of the key as shown in Fig. 23, said pin reaches the rear end of the slot and pulls the latch lever 221 toward the rear, releasing the detents 217 and allowing them to be thrown forward by the stretched spring 237 into engagement with the star wheels 215. These detents strike the star wheels a blow and accurately position the wheels and the shafts 197. In the first part of the up stroke of the key, the latch 221 is released from the pin 242 and in the course of such up stroke the detents 217 are drawn back to normal position.

The denomination selecting mechanism for coupling the shaft 197 with the various register wheels one at a time, can be understood in part from Figs. 8 and 17. Each of said register wheels comprises a gear or pinion 244, here shown as having twenty teeth. In the plane of each of said pinions 244 the shafts 197 have rigidly mounted thereon small gears or pinions 245 so that when one of the shafts 197 is turned all of the pinions 245 on said shaft turn with it. I provide connecting pinions for bringing the register wheels selectively into gear with the driving gears 245. The pinions are mounted in movable frames which, in the present instance, are pivoted co-axially with the shaft 197. There is for each denomination a frame comprising two plates 246 secured together and spaced apart by posts 247 and said plates are pivoted on the shaft 197, one on the right hand and the other on the left-hand side of the hub of each of the gears 245. Mounted between the two plates of each pair and journaled in them are two small pinions 248 and 249, the former constantly in mesh with the gear 245 and the latter in mesh with the said former pinion 248. The construction is such that the pinions 248 and 249 are always in gear with the gear 245. The frame 246 normally stands in the position shown in Figs. 7 and 16, in which the pinion 249 is out of mesh with the gear 244; but the frame 246 can be swung upward about the shaft 197 as a center until the pinion 249 meshes with the pinion 244 as shown in Figs. 8 and 17. As the pinion 245 is stationary during this swinging movement, said movement of course results in a turning motion being communicated to the pinion 248 and from that to the pinion 249. The pinion 248 will turn toward the rear of the machine and the pinion 249 toward the front of the machine. As the shaft 197 stands below and in rear of the lowermost point of the pinion 244, the bodily motion of the pinion 249 is in an oblique direction upward and toward the rear. The parts are so arranged and proportioned that the turning motion of said pinion 249 toward the front of the machine is substantially compensated for by the obliquity of the bodily motion of said pinion, with the result that the top-most tooth of the pinion moves straight up into mesh with the pinion 244, or at least near enough so for practical purposes.

It will be perceived that any suitable means can be employed to elevate the frames 246 one at a time and that thereby the register wheels of either register will be coupled one at a time with the shaft 197 so that the motion imparted to said shaft by the differential mechanism can be communicated to any selected one of the register wheels and this can be done in either one of the registers or in both at the same time. In the present instance, the frames 246 are controlled by bell-cranks 251 pivoted on the frame rods 181. Each of these bell-cranks has an arm extending forward and upward and formed at its free end with an open slot which embraces a pin 252 projecting from one of the frame plates 246. Each of said levers also has an upright arm which, as here shown, is formed with two stop projections 253 and 254, in the opening between which lies the frame rod 180, said opening being of sufficient width to permit of the desired extent of rocking motion being given to the bell-crank. Said bell cranks are normally drawn to position to drop the frames 246 down, by means of springs 255, each connected to one of the upright arms of the bell cranks and extending thence toward the front of the machine. Any one of the bell cranks 251 can be operated by means of a link 256 extending from said bell crank toward the rear of the machine and pivoted at its rear end to an arm 257 projecting upward from a horizontal transverse rock shaft 258. As shown in Figs. 2 and 17, there is one of these rock shafts for each denomination, nine being shown in the present instance, and they extend across the machine, being pivoted at their ends in stationary plates 260 secured by screws 261 to bosses projecting from the side plates 34. In order to stiffen these shafts 258 and all the other shafts in the rear part of the machine, frame plates 262 and 263, preferably made on a general principle somewhat resembling that of the plates 65 and ... may be provided. As shown in Fig. 2, ...h of the rock shafts 258 has two arms 257 projecting upward therefrom, one for each of the two registers, and the two arms from any one of these rock shafts are connected with the register wheels of the same denomination in the two registers, so that when any one of the rock shafts 258 is operated the register wheels of corresponding denomination in both registers will be connected with their respective shafts 197.

In order to operate the shafts 258 any suitable means may be provided, as far as the parts of my invention already described are concerned. I have however provided novel means for rocking these shafts under the direct control of the typewriter carriage, preferably through the column stops 27, so that the same column stops which are used to position the carriage also serve to connect up with the differential mechanism, the particular register wheel that corresponds in denomination with the denominational position of the carriage.

As shown in Figs. 1, 2, 13 and 17, a transverse rock shaft 264 is journaled at its ends in the frame plates 260 and said rock shaft has projecting therefrom toward the rear of the machine two arms 265, and said arms support a transverse cross rod 266, the whole constituting a sort of yoke frame the rod 266 of which is moved up and down by the rocking of the shaft 264. On said rod 266 are pivoted a number of bell cranks 267, one for each denomination, and each of said bell cranks has an upright arm to which is pivoted the rear end of a link 268, the forward end of which is pivoted to an arm 270 projecting upward from one of the rock shafts 258. Each of said rock shafts is thus connected with one of the bell-cranks 267 as will be understood from Fig. 2. Each of said bell-cranks has a horizontal arm projecting toward the rear, to which is pivoted the lower end of an upright bar or feeler 271. These bars or feelers 271 extend upward to a position adjacent the typewriter carriage, that is to say, to a position where they can coöperate with a part carried by said carriage. Said bars pass through the guide plate 165, the bars fanning in as shown in Fig. 13 and being thickened at their upper ends at 272. The upper ends of these feelers lie just below the path of the lower edge of each of the rearward projections 167 and 168 of the column stops 27, which projections constitute abutments or selectors which select the feelers and coöperate with said feelers to connect the register wheels one denomination at a time with the drive shafts. The construction is such that if one of these column stops stands above the series of feelers and if then the shaft 264 be rocked to move the rod 266 upward, then all of the feelers 271 will move upward idly except the one that is located immediately beneath the column stop. This one will be arrested and the operation will cause its bell crank 267 to be operated; and said bell crank of the obstructed feeler will, through its link 268, rock one of the shafts 258 and cause the register wheels of a denomination corresponding to the denominational position of the carriage, to be connected with the shafts 197.

In order to operate the shaft 264, said shaft has projecting upward therefrom a crank arm 273 (Figs. 1, 14 and 17) and said crank arm is connected by a link 274 with a lever 275 (Figs. 14 and 15) which lever is pivoted at 276 to a bracket 277 secured by screws 278 to a lug of the left-hand frame piece 34. The left-hand end of the shaft 103 is journaled in the same bracket. At its lower end the lever 275 has pivoted thereto at 280 a pawl 281, which pawl is normally held up by a spring 282 in position to engage a lug 283 projecting from the side of the upright arm of a bell crank 284. Said bell crank is pivoted at 285 to the bracket 277 and it has a horizontal arm that is controlled by a spring 286, which spring tends to move the upright arm of the bell crank toward the front of the machine. The spring is also connected with the lever 275 in such a way as to move the upper end of said lever toward the rear of the machine into engagement with a stop pin 287. The upright arm of the bell crank 284 is bent back upon itself to form a U-shaped part 288 between the branches of which there is journaled a follower roller 290, which roller is pressed by the spring 286 against the rear edge of a cam or segment 291 which is rigidly mounted on the universal rock shaft 78. An arm 292 of this segment is adapted to strike up against the stop bar 98 to limit the return motion of the universal rock shaft 78. The rear edge of the segment 291 comprises an inclined part 293 with which the roller 290 is normally in engagement and a concentric part 294 on to which the roller passes early in the down stroke of a key. The construction is such that in the first part of the down stroke of any key the roller 290 is moved toward the rear of the machine and is held in that position during the whole of the down stroke of said key. When said roller and the lever 284 are moved toward the rear, such rearward motion is communicated by the pawl 281 to the lower end of the lever 275 and the upper end of the said lever 275, acting through the link 274, rocks the shaft 264 to connect one of the register wheels with its drive shaft. The pawl 281 is tripped off in the first part of the up-stroke of the key and the denomination selecting mechanism is allowed to snap back to normal position. This is effected by a trip pawl 295 pivoted at 296 to the segment 291 and normally held by a spring 297 against a stop pin 298. In the last part of the down stroke of the key the pawl 295 snaps over the projecting end 300 of the pawl 281 and in the first part of the up-stroke of the key said pawl 295 depresses the pawl 281, thus releasing the lever 275 from the lever 284 and allowing the denomination selecting mechanism to snap instantly back to normal position, with the result that when the rack bars 112 and 113 are moving back to their normal positions no register wheels are connected with the drive shafts 197.

It will be perceived that the register wheels are not connected with the drivers by the motion of the typewriter carriage, but by the operation of the numeral keys. The column stops that serve as selectors, move freely across the series of feelers in either direction without affecting the computing mechanism in any way and without said mechanism in any way affecting the motion of the carriage.

Mechanism similar to that shown in Figs. 14 and 15 for actuating the denomination selecting mechanism and for tripping said mechanism off, is shown and described and claimed in an earlier application of mine. A series of feelers all operated together and means for obstructing said feelers one at a time and thus modifying the motion of the parts so as to bring into operation the register wheel of a denomination corresponding to that of the obstructed feeler, is also shown and claimed in prior applications of mine and in said prior applications the means for obstructing the feelers one at a time are operated by the typewriter carriage. Said obstructing means in my prior applications, however, is not mounted directly on the typewriter carriage, and it does not constitute a part of the tabulator mechanism as in the present case. In said prior applications also there is a series of abutments one for each feeler and said abutments are brought one at a time into coöperative relation with their respective feelers. In the present instance there is a single abutment for all of the feelers and said single abutment moves from coöperative relation with one feeler to a similar relation to the next feeler and some of the claims of the present case are drawn to the specific combination, my earlier applications referred to containing broader claims that dominate the claims of the present case. My prior applications referred to, contain claims that read on the present case and the present case contains no claims that read on the constructions shown in said prior applications.

It is highly desirable in a machine of this character to prevent the computing mechanism from interfering with the stepping of the typewriter carriage. Some typewriters are equipped with carriage escapements that are adapted to free the carriage for its stepping motion during the down stroke of a key. In the typewriter shown in the present case the carriage is freed as soon as the lever or universal bar 23 is struck by the type bar. When the transverse bar 266 is in its uppermost position due to the depression of one of the computer keys, the upper ends of all of the feelers except the obstructed one, stand above the lower edge of the column stop so that the next feeler to the left of the obstructed one would tend to prevent the carriage from moving. I accordingly guide the upper ends of all of the feelers in a movable frame or plate 301 (Figs. 13 and 19), which plate is mounted for movement in a right and left-hand direction equal in extent to a letter space movement of the typewriter carriage. The plate 301 is mounted above the plate 165 and the feelers pass up through a slot 302 in said plate 165 and into two slots in the plate 301, which slots, as here shown, are separated by a cross bar 303 of the plate 301, thus leaving a space for the decimal point in registering sums in United States money. It will, of course, be understood that cross bars like the one shown can be located at any desired positions for the purpose of punctuation or pointing off the figures. The plate 301 has two posts 304 which slide on the top of the plate 165, and screws 305 pass upward through slots 306 in said plate 165 and are threaded into the posts 304. The slots 306 are of such a length as to allow to the screws 305 a motion about equal to one letter space movement of the typewriter carriage. One of the screws 305 is connected with a contractile spring 307, which spring is also connected to an ear 308 bent down from the plate 165; and this spring normally holds the plate 301 and the set of feelers in their right-hand position. If a key be held down long enough so that it would interfere with the stepping of the typewriter carriage, said carriage can step nevertheless moving the whole series of feelers 271 a little to the left until the key is released and said feelers drop down to normal position. Being then freed from the column stop they are drawn back to the right by the spring 307. As there is no feeler 271 immediately at the left of those feelers which correspond to the units of cents and the units of dollars denominations, I form upon the left-hand upper edge of each of these feelers a little flange 310, which when one of these feelers is engaged with a column stop will prevent said column stop from moving off of the end of the feeler when the carriage makes its step.

The transfer mechanism is of the Geneva wheel type. As shown in Fig. 10 each of the register wheels comprises a hub 311 journaled on the shaft 191 and said hub is turned with a series of steps and shoulders to support the different parts of which the wheel is composed. I have hereinbefore designated these wheels by the numeral 190 but specifically said numeral is applied to the drum on which the numerals are imprinted. This drum as here shown consists of a flanged disk that occupies the middle of the hub 311. Just at the right of said disk there is mounted the twenty-toothed gear or pinion 244 and just at the right of said gear there is mounted a ten-toothed gear 312 which receives motion by transfer from the next register wheel to the right. At the left of the drum 190 there is mounted a locking wheel 313 and at the left of that a wheel 314 which is smooth except that it has projecting from its periphery a wide tooth 315, Fig. 5. As shown in Figs. 3, 4 and 5, the wheel 313 has a smooth circular periphery except that it is formed with one notch 316, which corresponds in position with the middle of the wide tooth 315. The wheel that coöperates with the wheels 312, 313 and 314, that is to say, which coöperates with the wheels 313 and 314 of one register wheel and with the wheel 312 of the next register wheel of higher order, consists in effect of three pinions, the teeth of which are designated on the drawings 317, 318 and 320. The teeth 317 and 318 are arranged like the teeth of a twelve-toothed pinion but every other tooth cut out in the series 317 and in the series 318 every tooth corresponding to the teeth 317 cut out. The teeth 320 are those of a six-toothed pinion which mesh with the wheel 312 of the next higher order. The teeth 317 normally ride on the periphery of the wheel 313 as shown in Fig. 5. When the tooth 315 reaches the inwardly projecting tooth 318, the transfer pinion begins to turn, such turning being then permitted by reason of the fact that the notch 316 has then just reached one of the teeth 317.

The transfer pinions are mounted in levers 321 which are pivoted on a frame rod 322 supported by the partition plates 193 as shown in Fig. 16. The upper end of each of the levers 321, is bent back upon itself, forming an inverted U-shaped part 323 between the branches of which the transfer pinion is journaled. The lever 321 is drawn toward the register wheel by the spring 255, which is connected at one end to an ear 325 (Fig. 7) bent off from said lever and at the other end to the lever 251. The main body of the lever 321 comes up just at the left of the partition plate 193 and the ear 325 extends across the partition plate and just in front of an arm or branch 326 of said plate. Said arm, coöperating with said ear, serves as a stop to limit the extent of engagement between the transfer pinion and the register wheels, and this stop can be adjusted by bending the arm.

In order to lock the transfer pinions in engagement and to provide for releasing them when necessary, each of the levers 321 has pivoted thereto at 327 a locking lever 328. Said lever extends from the pivot 327 toward the front of the machine and its forward end normally stands as shown in Fig. 7 against a transverse bar 330 which prevents motion of the levers 328 and 321 toward the front of the machine. The lever 328 has another arm that extends from the pivot 327 downward and toward the back of the machine and the end of said arm rests on one of the posts 247 of the connecting frame 246. The lever 328 is held down in engagement with said post by a spring 331 connected at one end to the lever 328 and at the other end to a depending arm of the lever 321. The construction is such that when the frame 246 is elevated, as shown in Fig. 9, to connect that particular register wheel with the shaft 197, the rear end of the lever 328 is elevated and the forward end of said lever is depressed against the ear 325 with the result that the lever 328 is moved down below the bar 330 and the further motion of said lever rocks the lever 321 about its pivot and moves the transfer pinion out of engagement with the register wheels. As shown in Fig. 10 each of the sleeves 194 has projecting therefrom a lug or tooth 332 that engages in between two of the teeth 320 when the transfer pinion is moved out of engagement, in order to lock said pinion in its proper position. When the frame 246 moves downward the levers 328, 321 are restored to their normal positions by means of their springs 331 and 324. A Geneva transfer system having some points in common with the one here shown and also a locking and releasing system for said Geneva transfer having points in common with that here shown, are shown and described and claimed in a prior application of mine which prior application contains claims that read on the construction shown and described herein. The present application does not contain any claims on these features that read on said prior application.

Each of the levers 321 stands at the left-hand side of one of the partition plates 193 which prevents motion of said lever toward the right. In order to guide said levers on the other side, a comb-plate 333 is secured to the top of the bar 330 by screws 334 as best shown in Figs. 16 and 42. This comb-plate has teeth 335 which project toward the rear and each of them lies just at the left of one of the levers 321.

The register wheels can be set to zero by setting the register for subtraction and writing the totals. I have, however, provided additional means for setting the registers to zero independently. As shown in Fig. 10, the shaft 191 is formed with a series of notches 336 and as best shown in Fig. 26, each of the register wheel drums 190 has pivoted thereto at 337 a pawl 338, which lies in a transverse slot cut in the hub 311 and is pressed into engagement with the shaft 191 by a spring 340. As shown in Fig. 10, the notches 336 are normally out of line with the pawls 338 so that said pawls normally turn on a smooth part of the shaft. The notches can be brought into line with the pawls, however, by moving the shaft endwise. Fig. 10 shows a part of the right-hand register and the shaft 191 of that register is adapted to be moved toward the left to bring the notches into line with the pawls. The shaft 191 of the left-hand register, is adapted to be moved toward the right for the same purpose. When the shaft has thus been moved endwise it can be rotated by means of a handle 341, Fig. 6, secured on the end of the shaft outside of the frame plate 34. In setting the register wheels to zero by the handle 341 it is necessary to release said register wheels from their normal locking engagement with the Geneva pinions. To this end the bar 330 is arranged to be moved bodily toward the front of the machine. As shown in Figs. 11 and 12, said bar is mounted at its ends on arms 342 which in turn are rigidly mounted on the rod 178 hereinbefore referred to, which rod is a rock shaft mounted in the manner hereinbefore described, in the end plate 182 and in the plate 196. At its end nearest the middle of the machine, the rocking frame thus provided has an arm 343 which in the present instance, consists of a branch of one of the arms 342. The arm 343 extends to a point beneath the inner end of the shaft 191, which end of said shaft as shown in Fig. 6, is formed or provided with an enlargement consisting of a cylindrical end 344 of a considerably greater diameter than the shaft 191 but connected with said shaft by a taper or conical part 345. The arm 343 normally rests beneath the enlarged cylindrical part 344 as shown in Fig. 11, and said arm is thereby locked against rocking upward and toward the front of the machine and the bar 330 is thereby locked against motion toward the front of the machine. When the shaft 191 is moved inward, the enlarged part 344 moves away from the arm 343 and allows said arm to move upward as shown in Fig. 12, thus permitting the bar 330 to move a sufficient distance toward the front of the machine to unlock the transfer pinions. I have also provided means for withdrawing all of said transfer pinions from engagement with the register wheels. A transverse bar 347 (Figs. 16 and 42) lies above and just in front of the upper ends of the levers 321, said bar being supported by arms 348 pivoted on the rod 322 which serves also as a pivot for the levers 321. Above the U-shaped part of each of said levers 321, the bar 347 has projecting therefrom toward the rear a series of pins 350, each of said pins at its free end being bent downward as shown in Fig. 16 behind the U-shaped part of one of the levers 321. A handle 351 projects upward from the bar 347 through a slot 352 (Fig. 2) in the cover plate 40. The construction is such that when the shaft 191 has been moved inward and the bar 330 has been moved or is free to be moved toward the front of the machine, the handle 351 can be manipulated to pull the bar 347 toward the front and with it all of the transfer pinions, thus leaving the register wheels free to be turned to zero.

In order to prevent the register wheels from being turned past zero by friction or momentum, each of said wheels has a pin 353 projecting therefrom, and said pins are in position to be arrested by arms or tongues 354 projecting from a light rocking frame 355 which is pivoted on the rock shaft 218 and tends to drop by gravity into contact with the wheels. This frame is normally held up out of the paths of the pins 353 by an arm 356 of said frame which arm has its forward end inclined upward and normally resting on an ear 357 bent off from one of the arms 348 which support the bar 347. The construction is such that the frame 355 is normally held up by the means described but when the bar 347 is drawn forward, the ear 357 is moved away from the arm 356 and the frame drops down by gravity into position to arrest the pins 355.

In order to control the motion of the shaft 191 when setting the register wheels to zero, said shaft has mounted thereon a wheel 358, the hub 359 of which is rigidly secured to the shaft as by a pin 360 (Figs. 6 and 42), and said hub is counterbored to receive a spring 361 which is coiled about the shaft and compressed between said hub and the frame plate 182, so that said spring normally holds the shaft in its outer position. The wheel 358 is formed with a flange in which is cut a notch 362 of the form shown in Fig. 42. A pin 363, consisting of the reduced lower end of a screw, normally occupies the inner end of the notch 362 and said pin both limits the outward motion of the shaft and also holds the shaft against turning. A screw 363 is threaded through an ear 364 bent off horizontally from the frame plate 182. The construction is such that the shaft cannot be turned except by first moving it lengthwise, and once it has begun to turn the pin 363 prevents its outward motion until it has completed a rotation, at the end of which rotation, when the notch 362 again reaches the pin 363, the shaft is automatically moved outward by the spring 361.

An endwise moving shaft, working for the purpose of setting a register to zero in much the same way as that here illustrated and described, is shown and claimed in a prior application of mine in which application the shaft has notches similar to the notches 336, and said notches coöperate with pawls much like the pawls 338 of the present case. The present application does not contain any claims that read on the said prior application.

From the foregoing description it will be evident that many of the features of my invention are capable of considerable modification without departing from the invention; that some of the features of the invention can be used without others; and that some of the features of the invention are capable of use in or adaptation to machines differing very considerably from the specific one illustrated.

What I claim as new and desire to secure by Letters Patent, is:—

1. In a combined typewriting and computing machine, the combination of a typewriter frame, a computer frame on top of which said typewriter frame is mounted, said computer frame having a projection from one side thereof, computer keys mounted in said projection and situated by the side of the typewriter keyboard, computing mechanism, typewriting mechanism, and connections from said computer keys to said computing and typewriting mechanisms.

2. In a combined typewriting and computing machine, the combination of a typewriter frame, a computer frame on top of which said typewriter frame is mounted, said computer frame having a projection from one side thereof, computer keys mounted in said projection and situated by the side of the typewriter keyboard, transverse rock shafts operated by said computer keys, computing mechanism, typewriting mechanism, and connections from said rock shafts to said computing and typewriting mechanisms.

3. In a combined typewriting and computing machine, the combination of a typewriter frame, a computer frame on top of which said typewriter frame is mounted, said computer frame having a projection from one side thereof, computer keys mounted in said projection and situated at the side of the typewriter keyboard, transverse rock shafts operated by said computer keys and extending beneath the typewriter, typewriting mechanism including numeral keys and other printing keys, computing mechanism, connections from said rock shafts to said computing mechanism, and connections from said rock shafts to said numeral keys adapted to operate said numeral keys but to leave said numeral keys free to be operated independently of said rock shafts.

4. In a combined typewriting and computing machine, the combination of a typewriter frame, a computer frame on top of which said typewriter frame is mounted, said computer frame having a projection from one side thereof, computer keys mounted in said projection and situated at one side of the typewriter keyboard, transverse rock shafts having crank arms to which said computer keys are connected, numeral keys in the typewriter, crank arms on said rock shafts connected with said numeral keys, and computing mechanism connected with said rock shafts, the first mentioned set of crank arms being longer than the second mentioned set, whereby the computer keys are given a greater extent of dip than the typewriter keys.

5. In a computing machine, the combination of a plurality of registers, separate operating devices for the different registers, a single differential mechanism, and a coupling device adjustable to different positions to couple the different ones of said operating devices to said differential mechanism.

6. In a computing machine, the combination of two registers, separate operating devices for said registers, a single differential mechanism, and a coupling device adjustable to three positions in one of which it connects one of said operating devices with said differential mechanism, in another of which it connects the other of said operating devices with said differential mechanism, and in the third of which positions it couples both of said operating devices with said differential mechanism.

7. In a computing machine, the combination of a plurality of registers, separate racks for operating the different registers, a single differential mechanism, and means for coupling any one of said racks with said differential mechanism as desired.

8. In a computing machine, the combination of a traveling carriage, a plurality of registers, separate operating devices for the different registers, a single differential mechanism, and means controlled by the travel of said carriage for connecting different ones of said operating devices with said differential mechanism.

9. In a computing machine, the combination of a plurality of registers, a plurality of operating devices for the different registers, a single differential mechanism, means for coupling any one of said operating devices with said differential mechanism, and means for causing the one of said operating devices that is so coupled to act on its register in one denomination after another.

10. In a computing machine, the combination of a series of keys, a traveling carriage, a plurality of relatively stationary registers, separate operating devices for the different registers, a single differential mechanism, means for coupling any one of said operating devices with said differential mechanism, and means operated by said keys and controlled by said carriage for connecting the operating device that is so coupled to its register in one denomination after another.

11. In a computing machine, the combination of a series of keys, a traveling carriage, a plurality of relatively stationary registers, separate operating devices for the different registers, a single differential mechanism, means controlled by said carriage for connecting different ones of said operating devices with said differential mechanism, and means controlled by said carriage for causing the operating device that is so connected to act on its register in one denomination after another.

12. In a computing machine, the combination of a plurality of registers each comprising a series of register wheels, a traveling carriage, separate operating devices for the different registers, a series of normally open trains of gearing from the wheels of each register to the operating device of that register, one such train of gearing for each wheel, means controlled by said carriage for closing in each of the registers one of said trains of gearing at a time, a single differential mechanism, and means for coupling to said differential mechanism any desired one of said operating devices.

13. In a computing machine, the combination of a plurality of series of register wheels, a plurality of shafts, one extending along each of said series of wheels and having thereon a pinion for each of said register wheels, means for gearing any selected one of said register wheels with its pinion, and means for operating any selected one of said shafts.

14. In a combined typewriting and computing machine, the combination of a typewriter carriage, a plurality of relatively stationary series of register wheels, denomination selecting mechanism controlled by said carriage and extending to the wheels of all of said series, a plurality of operating devices one for each of said series of register wheels, and means for operating said operating devices selectively, said denomination selecting mechanism acting to connect the register wheels of corresponding denomination in all of said series with their respective operating devices.

15. In a computing machine, the combination of a plurality of registers, separate operating devices for the different registers, a single differential mechanism, means for selectively connecting said operating devices with said differential mechanism, and independent means in at least one of said operating devices for setting said device for addition or subtraction as desired.

16. In a computing machine, the combination of a plurality of registers, a plurality of operating shafts, one for each register, a single differential mechanism, means for connecting said shafts selectively with said differential mechanism, and independent means for causing one of said shafts to turn one way for addition and the other way for subtraction.

17. In a computing machine, the combination of a plurality of registers, a plurality of operating shafts, one for each register, a single differential mechanism, means including rack bars for connecting said shafts with said differential mechanism selectively, and change gear devices for reversing the direction of rotation of said shafts for addition and subtraction.

18. In a computing machine, the combination of a plurality of registers, a plurality of operating shafts, one for each register, a pinion on each of said shafts, a forked rack bar engaging each of said pinions, means for shifting each of said rack bars to engage said pinions on one side or the other for addition and subtraction, a single differential mechanism, and means for coupling any one of said rack bars with said differential mechanism.

19. In a computing machine, the combination of a plurality of registers, means including a rack bar for actuating each of said registers, differential mechanism including a shaft that is rocked different distances corresponding to the different digits, an arm fixed to said rock shaft, arms pivoted on said rock shaft and connected to said rack bars, and a coupling device shiftable to couple said fixed arm with different ones of said pivoted arms.

20. In a computing machine, the combination of a plurality of registers, separate means for operating the different registers, a single differential mechanism, means for coupling said differential mechanism with said operating means selectively, and means for locking said differential mechanism when said coupling means is not properly positioned.

21. In a computing machine, the combination of two registers, separate operating devices for the different registers, a differentially movable part having a coupling device thereon, means for setting said coupling device to any one of three positions, a hook on one of said operating devices to which said coupling device is connected in one of its positions, a hook on the other of said operating devices to which said coupling device is connected in another of its positions, and means on both operating devices to which said coupling device is connected in its third position.

22. In a computing machine, the combination of a differentially movable rock shaft, an arm projecting from said rock shaft, a link pivoted to said arm and having a cross pin thereon, two other arms pivoted to said rock shaft, a hook on one of said arms which is engaged by said pin in one position thereof, a hook on the other of said arms engaged by said pin in another position thereof, means on both said arms engaged by said pin in a third position thereof, and two separate registers operated by said pivoted arms.

23. In a computing machine, the combination of a differentially movable rock shaft, an arm projecting from said rock shaft, a link pivoted to said arm and having a cross pin thereon, two other arms pivoted to said rock shaft, a hook on one of said arms which is engaged by said pin in one position thereof, a hook on the other of said arms engaged by said pin in another position thereof, means on both said arms engaged by said pin in a third position thereof, two separate registers operated by said pivoted arms, and means for guiding said pin in any one of its three set positions.

24. In a computing machine, the combination of a differentially movable rock shaft, an arm projecting from said rock shaft, a link pivoted to said arm and having a cross pin thereon, two other arms pivoted to said rock shaft, a hook on one of said arms which is engaged by said pin in one position thereof, a hook on the other of said arms engaged by said pin in another position thereof, means on both said arms engaged by said pin in a third position thereof, two separate registers operated by said pivoted arms, a slotted lever engaging said pin, and means for adjusting said lever.

25. In a combined typewriting and computing machine, the combination of a typewriter carriage, a plurality of registers, a single differential mechanism, separate means for operating the different registers, and means controlled by the typewriter carriage for coupling said operating means selectively with said differential mechanism.

26. In a combined typewriting and computing machine, the combination of a typewriter carriage, an abutment on said carriage, a device on the stationary framework adapted to be moved by said abutment during the traverse of said carriage and held in the position to which it is thus moved during a predetermined part of such traverse, a register, numeral keys, and means operated by said device for rendering said register operative under the control of said keys.

27. In a combined typewriting and computing machine, the combination of a typewriter carriage, a part mounted on said carriage, a coöperating part mounted on the stationary framework, one of said parts being arranged to move the other part to an abnormal position and to hold it in such position during the predetermined portion of the traverse of said carriage, a register normally inoperative, and means operated by said moved part for rendering said register operative.

28. In a combined typewriting and computing machine, the combination of a register, numeral keys, a device movable to two positions, in one of which it connects said keys with said register and in the other of which said keys are disconnected from said register, and means operated by the traverse of said carriage for moving said device to its connecting position and for holding it in that position during a predetermined part of the traverse of said carriage.

29. In a combined typewriting and computing machine, the combination of a register, numeral keys, means for connecting said keys with and disconnecting them from said register, and means for operating said connecting and disconnecting means, said operating means including two coöperating abutments, one moving in unison with the typewriter carriage and the other relatively stationary, and one of said abutments adjustable with relation to the travel of said carriage, and one of said abutments arranged to move the other to an abnormal position and to hold it in that position during a predetermined part of the traverse of said carriage.

30. In a combined typewriting and computing machine, the combination of two registers, numeral keys, means normally connecting said keys with one of said registers, said means being movable to connect said keys with the other of said registers, a typewriter carriage, and means operated by said carriage for shifting said connecting means.

31. In a combined typewriting and computing machine, the combination of a typewriter carriage, two relatively stationary registers, numeral keys, means shiftable to a plurality of positions in one of which it connects said keys with one of said registers and in another of which it connects said keys with the other of said registers, and means controlled by said carriage for shifting said shiftable means.

32. In a combined typewriting and computing machine, the combination of a register comprising a series of registering elements, differential mechanism, a typewriter carriage, a coupling device shiftable to connect said differential mechanism with and to disconnect it from said register as a whole, said coupling device being operated by said typewriter carriage.

33. In a combined typewriting and computing machine, the combination of a typewriter carriage, a plurality of relatively stationary registers each comprising a series of registering elements, a single differential mechanism, means shiftable to connect said differential mechanism with either of said registers as a whole, and means operated by said carriage for shifting said shiftable means.

34. In a combined typewriting and computing machine, the combination of a typewriter carriage, tabulator mechanism for setting said carriage, said tabulator mechanism including one or more adjustable column stops and one or more coöperating stops, a register, numeral keys, means shiftable to two positions in one of which said register is connected to said keys and in the other of which said register is disconnected from said keys, and means operated by a column stop for shifting said shiftable means.

35. In a combined typewriting and computing machine, the combination of a typewriter carriage, tabulator mechanism for setting said carriage, said tabulator mechanism including an adjustable column stop and one or more coöperating stops, numeral keys, a plurality of registers, and register selecting mechanism controlled by said column stop and operating to determine which of said registers shall be operated by said keys.

36. In a combined typewriting and computing machine, the combination of a typewriter carriage, tabulator mechanism for setting said carriage, said tabulator mechanism including an adjustable column stop and one or more coöperating stops, a plurality of registers, a part moved to an abnormal position and maintained in such position by said column stop during a predetermined portion of the travel of said carriage, and means shiftable by said part to determine which register shall be operated.

37. In a computing machine, the combination of a series of register wheels, differential mechanism, a shaft extending along said series of wheels and having a series of gears thereon one for each of said wheels, means for connecting any selected one of said gears with its register wheel, and means for rotating said shaft from said differential mechanism in one direction for addition and in the other direction for subtraction.

38. In a computing machine, the combination of a series of register wheels, differential mechanism, a shaft extending along said series of wheels and having thereon a series of gears one for each of said wheels, means for connecting any one of said gears with its register wheel, a pinion on said shaft, and a change gear connection between said pinion and said differential mechanism for turning said shaft one way for addition and the other way for subtraction.

39. In a computing machine, the combination of a series of register wheels, differential mechanism, a shaft extending along said series of wheels and having thereon a series of gears one for each of said wheels, means for connecting one of said gears with its register wheel, and connections from said differential mechanism to said shaft, said connections including a pinion and a forked rack bar, and means for shifting said rack bar to engage said pinion on one side for addition and on the other side for subtraction.

40. In a computing machine, the combination of a series of register wheels, a driving shaft for said register wheels, means for operatively connecting said shaft with any one of said wheels, differential mechanism, and a change gear connection between said shaft and said differential mechanism, said change gear connection comprising a pinion and a forked rack bar, and means for shifting said rack bar to engage said pinion on one side for addition and on the other side for subtraction.

41. In a computing machine, the combination of a plurality of registers, separate means for operating the different registers, a single differential mechanism, means for coupling said differential mechanism with said operating means selectively, and means for preventing a change in the setting of said coupling means after an operation of said differential mechanism has begun.

42. In a computing machine, the combination of a plurality of registers, separate means for operating the different registers, a single differential mechanism, means for coupling said differential mechanism with said operating means selectively, and means for locking said differential mechanism when said coupling means is not properly positioned and for preventing a change in the setting of said coupling means after the commencement of an operation of said differential mechanism.

43. In a computing machine, the combination of a plurality of registers, separate means for operating the different registers, a single differential mechanism, a coupling device settable to different positions to couple said differential mechanism with said operating means selectively, and guiding means for said coupling means, said guiding means serving to lock said differential mechanism when said coupling means is not properly positioned and to prevent a change in the setting of said coupling means after an operation of said differential mechanism has commenced.

44. In a computing machine, the combination of a differentially movable part, means for moving said part through differential distances, a positioning device for said part, means for holding said positioning device out of engagement with said part, a spring for moving said positioning device into engagement with said part, means for putting said spring under tension, and means for releasing said holding means at the end of said differential movement.

45. In a computing machine, the combination of a differentially movable part, means for operating said part, a spring-driven positioning device, a latch for holding said positioning device out of engagement with said part, and means for tripping said latch at the end of an operation of said part.

46. In a computing machine, the combination of a differentially movable part, a series of keys and connections for moving said part different distances, a positioning device for said part, a spring for moving said device into engagement with said part, means operated during the down stroke of any of said keys for putting said spring under tension, and means for releasing said device at the end of the down stroke of a key.

47. In a computing machine, the combination of a series of keys, a universal bar operated by any of said keys, a part moved different distances by the different keys, a positioning device for said part, a spring for moving said positioning device into engagement with said part, means for holding said part against the tension of said spring, and means operated by said universal bar for putting said spring under tension, for releasing said positioning device from said holding means and for withdrawing said positioning device from engagement with said part.

48. In a computing machine, the combination of a differentially movable part, means for operating said part, a positioning device, means for holding said positioning device out of engagement with said part during the operation of said part, a universal member having a reciprocating motion, a lost motion connection between said universal member and said device, a spring joining the two elements of said lost motion connection, means for holding said device against the tension of said spring, and means for releasing said device from said holding means at the end of an operation of said part.

49. In a computing machine, the combination of a differentially movable part, a positioning device for said part, a reciprocatory member, a compound link joining said reciprocatory member with said device, said link comprising two elements having lost motion connection, a spring joining said elements, a latch for holding said device against the tension of said spring, and means for releasing said latch.

50. In a computing machine, the combination of a register, a shaft for operating said register, a star wheel on said shaft, a detent for coöperating with said star wheel, means for holding said detent out of engagement with said star wheel, a spring for moving said detent into engagement with said star wheel, and means for releasing said holding means.

51. In a computing machine, the combination of a register, a shaft for operating said register, a star wheel on said shaft, numeral keys, means operated on the downstroke of a key for turning said shaft, a universal bar, a detent for engaging said star wheel, a spring for moving said detent into engagement with said star wheel, means for holding said detent against the tension of said spring, and means operated by said universal bar for putting said spring under tension and for releasing said holding means.

52. In a computing machine, the combination of a plurality of registers, separate operating devices for said registers, means for actuating said operating devices selectively, a plurality of positioning devices one for each of said operating devices, spring means for operating said positioning devices together, means for holding said positioning devices against said spring means, and means for releasing said holding means at the end of an operation of said operating devices.

53. In a computing machine, the combination of a series of register wheels, a shaft lying along said series of wheels, a series of gears fixed on said shaft, and a series of pinions independently adjustable into and out of position to gear one of said gears with the corresponding one of said register wheels.

54. In a computing machine, the combination of a series of register wheels, a shaft lying along said series of wheels, a series of gears fixed on said shaft, one gear for each register wheel, and means for gearing any one of said gears with its register wheel independently of the other gears.

55. In a computing machine, the combination of two series of gears, the gears of one series being on a series of register wheels and the gears of the other series being operating gears, a series of trains of pinions each train of pinions being constantly in mesh with one of said gears and normally out of mesh with the corresponding gear of the other series, and means for moving any one of said trains of pinions into mesh with said gear of said other series.

56. In a computing machine, the combination of two series of gears, the gears of one of said series being on register wheels and the gears of the other of said series being operating gears, a series of frames pivoted co-axially with the gears of one of said series, pinions mounted in said frames, and means for swinging said frames separately to bring a gear of one of said series into gear with a gear of the other of said series.

57. In a computing machine, the combination of a register wheel, a driving wheel for said register wheel, two pinions constantly in mesh with one of said wheels, and means for moving said pinions in an oblique direction to bring one of said pinions into mesh with the other of said wheels, the arrangement being such that the rotation of said one of said pinions due to such oblique motion compensates for the obliquity of such motion and causes said pinions to move properly into mesh.

58. In a computing machine, the combination of a series of register wheels, a shaft lying along said series of wheels, a series of driving gears fixed on said shaft, a series of frames pivoted on said shaft, pinions mounted in said frames and meshing with said driving gears, and means for moving said frames to bring said pinions into mesh with said register wheels.

59. In a combined typewriting and computing machine, the combination of a typewriter carriage, a group of numeral keys, a series of register wheels, a shaft lying along said series of wheels, means operated by keys for turning said shaft through differential distances, a series of driving gears fixed on said shaft, a series of pinions for connecting said driving gears with their respective register wheels, and means operated by said keys and controlled by said carriage for moving said pinions selectively to connecting position.

60. In a computing machine, the combination of a plurality of registers each including a series of register wheels, a plurality of driving shafts, one for each of said registers, a series of gears on each of said driving shafts, and means for connecting in all of said registers simultaneously one after another of the register wheels of each register with the corresponding one of said driving gears.

61. In a computing machine, the combination of a plurality of registers each comprising a series of register wheels, a plurality of driving shafts, one for each of said registers, a series of driving gears on each of said shafts, a series of connecting pinions for each register, and means for moving in all of said registers simultaneously one of said connecting pinions for each register into position to gear one of said driving gears with the corresponding register wheel.

62. In a computing machine, the combination of a plurality of registers each comprising a series of register wheels, separate driving devices for the different registers, a series of rock shafts one for each denomination, means operated by each of said rock shafts for coupling a register wheel of each of said registers with the driving device of that register, and means for operating said driving devices.

63. In a computing machine, the combination of a plurality of registers each including a series of register wheels, a plurality of driving shafts one for each of said registers, a series of gears on each of said driving shafts, means for connecting in all of said registers simultaneously one after another of said register wheels of each register with the corresponding one of said driving gears, and means for operating said shafts selectively.

64. In a computing machine, the combination of a plurality of registers each including a series of register wheels, a plurality of driving shafts, one for each of said registers, a series of driving gears on each of said shafts, a series of connecting pinions for each register, means for moving in all of said registers simultaneously one of said connecting pinions for each register into position to gear one of said driving gears with the corresponding register wheel, a single differential mechanism, and means for connecting said driving shafts selectively with said differential mechanism.

65. In a computing machine, the combination of two registers arranged end to end and each comprising a series of register wheels, two operating devices one for each of said registers, means for actuating one or both of said operating devices differentially, a series of transverse rock shafts one for each denomination, and means extending from each of said rock shafts to each of said registers for coupling in both registers the register wheels of one denomination with the respective driving devices of said registers.

66. In a computing machine, the combination of two registers arranged end to end and each comprising a series of register wheels, two operating devices one for each of said registers, means for actuating one or both of said operating devices differentially, and means for coupling in both registers the register wheels of one denomination with the respective driving devices of said registers.

67. In a computing machine, the combination of a series of register wheels, a shaft lying along said series of wheels and having a series of gears fixed thereon, a series of frames pivoted coaxially with said shaft and carrying pinions, and means for rocking said frames selectively to gear said shaft with the selected ones of said register wheels.

68. In a computing machine, the combination of a series of register wheels, a shaft lying along said series of register wheels and having a series of gears fixed thereon, a series of pivoted frames carrying pinions, and means for moving said frames selectively to gear said shaft to selected ones of said register wheels.

69. In a computing machine, the combination of a plurality of registers each comprising a series of register wheels, a plurality of shafts one lying along each of said registers and each having a series of gears fixed thereon, a series of movable frames carrying pinions one frame for each register wheel, and selective means for moving said frames to gear selected ones of said register wheels with said shafts, said means acting in the same denomination at once in all of said registers.

70. In a computing machine, the combination of a plurality of registers each comprising a series of register wheels, separate operating devices for the different registers, a series of movable frames one for each register wheel and each adapted, when moved, to connect its register wheel with the operating device of its register, a series of frame-moving devices one for each denomination, connections from each of said devices to the movable frame of like denomination for each of said registers, and means for operating said frame-moving devices selectively.

71. In a computing machine, the combination of a plurality of registers each comprising a series of register wheels, separate operating devices for the different registers, a series of movable frames one for each register wheel and each adapted, when moved, to connect its register wheel with the operating device of its register, a series of frame-moving devices one for each denomination, connections from each of said devices to the movable frame of like denomination for each of said registers, means for operating said frame-moving devices selectively, and means for actuating said operating devices selectively.

72. In a computing machine, the combination of a series of registering elements, means for operating said registering elements, and denomination selecting mechanism comprising a series of feelers, one for each of said registering elements, means for operating all of said feelers, a single abutment for obstructing the motion of said feelers one at a time, means whereby the obstructed feeler brings the corresponding registering element into operation, and means for imparting a relative step-by-step motion between said series of feelers and said abutment.

73. In a combined typewriting and computing machine, the combination of a typewriter carriage, a series of registering elements, a series of feelers one for each of said registering elements, a single abutment movable under the control of said carriage across said series of feelers, and said abutment adapted to obstruct the motion of said feelers, one at a time, means for operating the series of feelers, and means operated by the obstructed feeler for bringing the corresponding registering element into operation.

74. In a combined typewriting and computing machine, the combination of a typewriter carriage, an abutment thereon, a series of registering elements, a group of numeral keys, printing means operated by said keys, differential mechanism controlled by said keys, and means for connecting said wheels one at a time with said differential mechanism, said means including a group of feelers adapted to be moved into contact with said abutment, means for operating all of said feelers, and means operated by the feeler which is arrested by said abutment for connecting one of said registering elements with said differential mechanism.

75. In a combined typewriting and computing machine, the combination of a typewriter carriage, numeral keys, registering elements, denomination selecting mechanism for bringing said registering elements one at a time under control of said keys, said mechanism including a group of feelers, one for each denomination, and said feelers located adjacent a part of the typewriter carriage, means for operating said group of feelers, an abutment on said carriage for arresting one feeler of the group at a time, and means operated by the arrested feeler for connecting the corresponding registering element with the keys.

76. In a combined typewriting and computing machine, the combination of a typewriter carriage, a series of registering elements, numeral keys, denomination selecting mechanism comprising a series of movable parts situated adjacent a portion of the typewriter carriage, a device carried by the typewriter carriage across said series of parts, and means whereby when any of said numeral keys is operated, said device is caused to coöperate with one of said movable parts to connect one of said registering elements with the keys.

77. In a combined typewriting and computing machine, the combination of a typewriter carriage, a series of registering elements, numeral keys, denomination selecting mechanism including a series of relatively movable parts, one for each denomination, means acting during the depression of a numeral key to produce a relative motion between one of said parts and the others, and connections including links operated by the said one of said parts for bringing the corresponding one of said registering elements under control of the keys, said means including a device mounted on the typewriter carriage and movable across said series of parts and arranged to stand, when the carriage is in the adding column, in register with one of said parts after another.

78. In a combined typewriting and computing machine, the combination with a typewriter carriage, tabulator mechanism for controlling said carriage and including an adjustable column stop, a series of registering elements, and numeral keys, of means for bringing a selected one of said registering elements under the control of said keys, said means including a series of relatively movable parts one for each of said registering elements, and a device forming part of said column stop and coöperating immediately with said relatively movable parts one at a time.

79. In a combined typewriting and computing machine, the combination of a typewriter carriage, denominational tabulator mechanism for positioning said carriage, said tabulator mechanism including a column stop, a series of relatively movable parts adapted to coöperate immediately with said column stop one at a time, numeral keys, a series of registering elements, and means operated by said parts during the first part of the down stroke of a key for bringing said registering elements one at a time under the control of said keys.

80. In a combined typewriting and computing machine, the combination of a series of registering elements, driving means, a series of numeral keys, a typewriter carriage, a series of trains of mechanical connections, each of said trains of connections extending from one of said registering elements to a point adjacent said carriage, a coöperating device carried by said carriage and movable across the series of said points, and means operated by the depression of a key and acting through the coöperation of said device with one of said trains of connections for connecting one of said registering elements with said driving means.

81. In a combined typewriting and computing machine, the combination of a series of registering elements of different denominations, numeral keys, driving means for said registering elements, a typewriter carriage and printing instrumentalities, and denomination selecting mechanism comprising a selector adjustably mounted on said carriage, a series of coöperating mechanical devices, one for each denomination, and means operated by said keys during a time when said carriage is standing still for causing said selector and coöperating devices to connect one of said registering elements with said driving means.

82. In a combined typewriting and computing machine, the combination of a series of registering elements of different denominations, numeral keys, driving means for said registering elements, a typewriter carriage and printing instrumentalities, tabulator mechanism including an adjustable column stop for setting said carriage, a series of devices, one for each denomination, across which a part of said column stop is arranged to travel, and means operated by said keys during a time when said carriage is standing still for causing said part of said column stop and said devices to coöperate to connect one of said registering elements with said driving means.

83. In a combined typewriting and computing machine, the combination of a typewriter carriage, denominational tabulator mechanism for positioning said carriage, said tabulator mechanism including a column stop, a series of feelers, one for each denomination, arranged adjacent the path of said column stop so that said stop travels across said series of feelers, means for operating said series of feelers so that one of them can be obstructed by said column stop, registering elements, and means for operating the registering element of a denomination corresponding to that of the obstructed feeler.

84. In a computing machine, the combination of a plurality of registers each comprising a series of registering elements, means for actuating said registering elements, and denomination selecting mechanism including a series of feelers, means for moving all of said feelers, means for obstructing the motion of a selected one of said feelers, and connections from said feelers to all of said registers.

85. In a combined typewriting and computing machine, the combination of a typewriter carriage, a series of registering elements, and denomination selecting mechanism comprising an abutment on said carriage, a series of feelers for coöperation with said abutment, and means for allowing said feelers to move with said abutment in case the carriage begins a stepping motion while said feelers are in operation.

86. In a combined typewriting and computing machine, the combination of a typewriter carriage, a series of registering elements, and denomination selecting mechanism comprising an abutment on said carriage, a series of feelers for coöperation with said abutment, a guide for said feelers, means for affording to said guide a limited motion with said abutment, and means for restoring said guide to normal position.

87. In a combined typewriting and computing machine, the combination of a typewriter carriage, a series of registering elements, and denomination selecting mechanism comprising a series of feelers, means for obstructing said feelers one at a time, said means being moved step-by-step with the typewriter carriage, and means for affording to said feelers a limited motion with said obstructing means in case said carriage begins to step while said feelers are in operation.

88. In a combined typewriting and computing machine, the combination of a typewriter carriage, a series of registering elements of different denominations, means for actuating said registering elements, and denomination selecting mechanism comprising a series of movable devices, one for each denomination, means whereby any of said devices when operated connects the corresponding registering element with said actuating means, a device movable step by step with said carriage and coöperating with said denominational devices one at a time, and means for affording to said series of denominational devices a limited motion with said step-by-step moving device in case the carriage begins a stepping movement during the operation of said mechanism.

89. In a combined typewriting and computing machine, the combination of a typewriter carriage, a plurality of registers, a device adjustable with relation to the travel of said carriage independently of said registers, and register selecting means and denomination selecting means both controlled by said adjustable device.

90. In a combined typewriting and computing machine, the combination of a typewriter carriage, a plurality of registers, a device adjustable with relation to the travel of said carriage independently of said registers, register selecting means and denomination selecting means both controlled by said adjustable device, and means coöperating with said device to position said carriage.

91. In a combined typewriting and computing machine, the combination of a typewriter carriage and printing instrumentalities, a plurality of registers, tabulator mechanism including adjustable column stops for positioning said carriage, and register selecting mechanism and denomination selecting mechanism controlled by said stops.

92. In a combined typewriting and computing machine, the combination of a typewriter carriage and printing instrumentalities, a plurality of registers, one of said registers normally connected up for operation in connection with the typewriter mechanism, tabular mechanism including adjustable column stops for positioning said carriage, denomination selecting mechanism adapted to be controlled by said stops, and means controlled by one of said stops for disconnecting said normally connected register and connecting up another of said registers.

93. In a combined typewriting and computing machine, the combination of a typewriter carriage and printing instrumentalities, a plurality of registers, tabulator mechanism including adjustable column stops for positioning said carriage, denomination selecting mechanism and register selecting mechanism, two of said stops being formed alike at one point and said denomination selecting mechanism being controlled by such like parts of said stops, and one of said stops being formed differently than the other at one point and said register selecting mechanism being controlled by such differently formed part.

94. In a computing machine, the combination of a stationary register frame, a register in said frame and comprising a series of register wheels, transfer mechanism comprising a series of movably mounted Geneva pinions, means for moving said Geneva pinions one at a time away from said wheels, and hand operated means for moving all of said Geneva pinions at once away from said wheels.

95. In a computing machine, the combination of a series of register wheels, transfer mechanism comprising a series of Geneva pinions, means for locking said pinions in engagement with said wheels, said locking means including a member common to all of said pinions, means for unlocking said pinions one at a time, and means for releasing said member to unlock all of said pinions at once.

96. In a computing machine, the combination of a series of register wheels, transfer mechanism including a series of Geneva pinions, means for locking said pinions in engagement with said register wheels, said locking means including a bar common to all of said pinions and separate locking levers for the separate pinions, means for releasing said separate locking levers from said bar, and means for locking and unlocking said bar so that all of said pinions can be unlocked at once.

97. In a computing machine, the combination of a series of register wheels, transfer mechanism comprising a series of Geneva pinions, a transverse bar, locking devices for the several pinions coöperating with said bar, means for releasing said locking devices one at a time, and means for moving said bar to an inoperative position to release all of said locking devices at once.

98. In a computing machine, the combination of a series of register wheels, transfer mechanism comprising a series of Geneva pinions, springs for moving said pinions into engagement with said wheels, locking devices for locking said pinions in engagement with said wheels, means for unlocking said pinions one at a time and moving them out of engagement with said wheels one at a time, means for unlocking all of said pinions at once, and separate means for drawing all of said pinions out of engagement when so unlocked.

99. In a computing machine, the combination of a series of register wheels, transfer mechanism comprising a series of Geneva pinions, means for locking said pinions in engagement with said wheels, means for releasing said pinions one at a time, and zero setting mechanism including a zero setting handle, and means operated by said handle for releasing all of said pinions from their locking means and for turning said register wheels to zero.

100. In a computing machine, the combination of a series of register wheels, transfer mechanism comprising a series of Geneva pinions, means for locking said pinions in engagement with said wheels, means for releasing said pinions one at a time, and zero setting mechanism including a zero setting handle, means operated by said handle for releasing all of said pinions from their locking means and for turning said register wheels to zero, and means acting automatically at the end of a zero setting operation to again lock said pinions in engagement.

101. In a computing machine, the combination of a series of register wheels, transfer mechanism comprising a series of Geneva pinions, means for locking said pinions in engagement with said wheels, means for releasing said pinions one at a time, a zero setting shaft, and means operated by said shaft for unlocking all of said Geneva pinions, turning said wheels to zero and re-locking said pinions.

102. In a computing machine, the combination of a series of register wheels, transfer mechanism comprising a series of Geneva pinions, means for locking said pinions in engagement with said wheels, means for releasing said pinions one at a time, a zero setting shaft, means operated by a longitudinal motion of said shaft for connecting said shaft with and disconnecting it from said register wheels, means operated by the longitudinal motion of said shaft for unlocking and re-locking said pinions, said shaft and said connecting means operating by a rotation of said shaft to set said wheels to zero.

103. In a computing machine, the combination of a series of register wheels, transfer mechanism comprising a series of Geneva pinions, means for locking said pinions in engagement with said wheels, means for unlocking said pinions one at a time, and zero setting mechanism including means for unlocking all of said pinions and for turning said register wheels to zero, and an arresting device for said register wheels normally in inoperative position and moved to operative position during an operation of said zero setting mechanism.

104. In a computing machine, the combination of a series of register wheels, transfer mechanism comprising a series of Geneva pinions, means for holding said pinions in engagement with said wheels, means for withdrawing all of said pinions from engagement with said wheels to set said wheels to zero, means for turning said register wheels to zero, and an arresting device for said register wheels normally in inoperative position but moved to operative position by said pinion-withdrawing means.

105. In a computing machine, the combination of a series of register wheels, transfer mechanism comprising a series of Geneva pinions, means for locking said pinions in engagement with said wheels, said locking means comprising a movable bar, means for locking said bar normally in its operative position, means for unlocking said bar, and a movable frame for withdrawing said pinions from engagement with said wheels.

106. In a computing machine, the combination of a series of register wheels, transfer mechanism comprising a series of Geneva pinions, means for locking said pinions in engagement with said wheels, said locking means comprising a movable bar, means for locking said bar normally in its operative position, means for unlocking said bar, a movable frame for withdrawing said pinions from engagement with said wheels, arresting means for said wheels controlled by said frame, and means for turning said wheels to zero.

107. In a computing machine, the combination of a series of register wheels, transfer mechanism comprising a series of Geneva pinions, separate locks for said pinions, a movable bar with which said locks coöperate, an endwise movable shaft, an enlargement on said shaft, means controlled by said enlargement for normally locking said bar in its operative position, said means being released from said enlargement by a longitudinal motion of said shaft, and means operated by said shaft for turning said wheels to zero.

108. In a computing machine, the combination of a series of register wheels, means normally locking said wheels against rotation, means for releasing said wheels one at a time, a movable frame with which all of said locking means coöperate, means for normally holding said frame in its operative position, and means for rendering said frame inoperative and for turning said register wheels to zero.

109. In a computing machine, the combination of two registers, operating means common to said registers, and connecting means including a device capable of three different settings, in one of which one only of said registers is rendered operable by said operating means, and in another of which the other only of said registers is so operable and in the third of which both registers are operable.

110. In a combined typewriting and computing machine, the combination of a typewriter carriage; typewriter printing mechanism; two registers; operating means common to said registers; connecting means including a device capable of three different settings, in one of which one only of said registers is rendered operable by said operating means, and in another of which the other only of said registers is so operable, and in the third of which both registers are operable; and means controlled by said typewriter carriage for setting said device.

111. In a computing machine, the combination of a series of register wheels each having a gear wheel, a differentially rotatable driving shaft having a series of gears mounted thereon, one gear corresponding to each register wheel, a series of movable frames each carrying two pinions, said pinions being in mesh with each other and one of said pinions being in mesh with one of said gears, and means for moving said frames selectively to bring the other of said pinions into mesh with the other of said gears in the same denomination.

112. In a computing machine, the combination of a series of register wheels each having a gear, a driving shaft having a series of gears, one corresponding to each of said register gears, a series of frames each pivoted co-axially with one of said gears, one frame for each denomination, two pinions mounted in each of said frames, said pinions being in mesh with each other and one of said pinions being in mesh with said co-axial gear, and means for swinging said frames selectively to bring the other of said pinions into mesh with the other gear for the same denomination.

Signed at Grand Rapids, in the county of Kent, and State of Michigan, this 5th day of September A. D. 1911.

GLENN J. BARRETT.

Witnesses:
HELEN M. NEWTON,
LACY H. SERGENT.

---

Copies of this patent may be obtained for five cents each, by addressing the "Commissioner of Patents, Washington, D. C."